United States Patent
Lauinger et al.

(10) Patent No.: US 10,264,058 B1
(45) Date of Patent: Apr. 16, 2019

(54) DEFINING VIRTUAL APPLICATION TEMPLATES

(71) Applicant: EMC Corporation, Hopkinton, MA (US)

(72) Inventors: Todd Michael Lauinger, Cardiff, CA (US); Shuping Jia, Carlsbad, CA (US)

(73) Assignee: EMC Corporation, Hopkinton, MA (US)

( * ) Notice: Subject to any disclaimer, the term of this patent is extended or adjusted under 35 U.S.C. 154(b) by 354 days.

(21) Appl. No.: 14/042,219

(22) Filed: Sep. 30, 2013

Related U.S. Application Data

(63) Continuation-in-part of application No. 13/174,213, filed on Jun. 30, 2011, now Pat. No. 9,282,142.

(51) Int. Cl.
*G06F 15/173* (2006.01)
*H04L 29/08* (2006.01)

(52) U.S. Cl.
CPC .................. *H04L 67/1002* (2013.01)

(58) Field of Classification Search
CPC ........... H04L 41/0213; H04L 29/08072; H04L 29/06; H04L 67/1002
USPC ........................................................ 709/223
See application file for complete search history.

(56) References Cited

U.S. PATENT DOCUMENTS

| | | | |
|---|---|---|---|
| 5,201,049 A | 4/1993 | Shorter | |
| 5,659,547 A * | 8/1997 | Scarr | G06F 11/2294 709/224 |
| 7,080,378 B1 | 7/2006 | Noland et al. | |
| 7,181,542 B2 | 2/2007 | Tuomenoksa et al. | |
| 7,373,660 B1 | 5/2008 | Guichard et al. | |
| 7,574,491 B2 | 8/2009 | Stein et al. | |
| 7,634,687 B2 * | 12/2009 | Haselden | G06F 11/0706 706/25 |
| 7,752,301 B1 | 7/2010 | Maiocco | |
| 7,784,060 B2 | 8/2010 | Baumberger | |
| 7,793,101 B2 | 9/2010 | Wipfel et al. | |
| 7,933,996 B2 | 4/2011 | Rechterman | |
| 7,949,677 B2 | 5/2011 | Croft et al. | |
| 7,987,497 B1 | 7/2011 | Giles et al. | |
| 8,103,842 B2 | 1/2012 | Murase et al. | |
| 8,275,868 B2 | 9/2012 | Rechterman | |
| 8,280,431 B2 | 10/2012 | Sedayao et al. | |
| 8,321,862 B2 | 11/2012 | Swamy et al. | |
| 8,336,089 B1 * | 12/2012 | Ahmed | G06F 21/00 726/5 |
| 8,429,718 B2 * | 4/2013 | Miller | H04L 63/104 705/7.27 |
| 9,547,485 B2 | 1/2017 | Suzuki | |
| 2002/0023210 A1 | 2/2002 | Tuomenoksa et al. | |
| 2003/0037089 A1 | 2/2003 | Cota-Robles | |
| 2003/0191792 A1 | 10/2003 | Waki | |
| 2004/0034853 A1 | 2/2004 | Gibbons | |

(Continued)

*Primary Examiner* — Davoud A Zand
*Assistant Examiner* — Dixon F Dabipi
(74) *Attorney, Agent, or Firm* — Peter Jovanovic; Krishnendu Gupta

(57) ABSTRACT

This disclosure relates to a system for defining enterprise applications operating in virtual datacenter. Application templates may be created containing the necessary information for provisioning and securing virtual applications in a tenant's virtual datacenter. The templates may define roles, service accounts, and scripts necessary for the datacenter to operate.

13 Claims, 14 Drawing Sheets

(56) References Cited

U.S. PATENT DOCUMENTS

| | | | |
|---|---|---|---|
| 2005/0120160 A1* | 6/2005 | Plouffe | G06F 9/45537 711/1 |
| 2006/0069761 A1 | 3/2006 | Singh et al. | |
| 2007/0006218 A1* | 1/2007 | Vinberg | G06F 8/61 717/174 |
| 2008/0013481 A1 | 1/2008 | Simons et al. | |
| 2008/0037557 A1 | 2/2008 | Fujita et al. | |
| 2008/0244688 A1* | 10/2008 | McClain | G06F 21/604 726/1 |
| 2008/0301770 A1 | 12/2008 | Kinder | |
| 2008/0307415 A1* | 12/2008 | Carter | G06F 9/44505 718/1 |
| 2009/0055693 A1 | 2/2009 | Budko et al. | |
| 2009/0106405 A1 | 4/2009 | Mazarick et al. | |
| 2009/0217267 A1 | 8/2009 | Gebhart et al. | |
| 2009/0249374 A1 | 10/2009 | Hepper | |
| 2009/0259945 A1 | 10/2009 | De Spiegeleer | |
| 2009/0271781 A1 | 10/2009 | Cui | |
| 2009/0276771 A1 | 11/2009 | Nickolov | |
| 2009/0300057 A1 | 12/2009 | Friedman | |
| 2010/0070870 A1 | 3/2010 | Halperin et al. | |
| 2010/0088150 A1 | 4/2010 | Mazhar et al. | |
| 2010/0106615 A1 | 4/2010 | Chadwick et al. | |
| 2010/0125712 A1 | 5/2010 | Murase et al. | |
| 2010/0131944 A1 | 5/2010 | Iorio | |
| 2010/0138830 A1* | 6/2010 | Astete | G06F 9/45533 718/1 |
| 2010/0153482 A1* | 6/2010 | Kim | G06F 8/61 709/201 |
| 2010/0205286 A1 | 8/2010 | Rechterman | |
| 2010/0205302 A1 | 8/2010 | Rechterman | |
| 2010/0274890 A1 | 10/2010 | Patel et al. | |
| 2011/0010711 A1 | 1/2011 | Patwardhan | |
| 2011/0019676 A1 | 1/2011 | Portolani et al. | |
| 2011/0071983 A1 | 3/2011 | Murase | |
| 2011/0093849 A1 | 4/2011 | Chawla et al. | |
| 2011/0209140 A1* | 8/2011 | Scheidel | G06F 8/61 717/172 |
| 2011/0296412 A1 | 12/2011 | Banga | |
| 2011/0307614 A1 | 12/2011 | Bernardi et al. | |
| 2012/0016778 A1 | 1/2012 | Salle et al. | |
| 2012/0054486 A1 | 3/2012 | Lakkavalli et al. | |
| 2012/0054624 A1 | 3/2012 | Owens et al. | |
| 2012/0089663 A1 | 4/2012 | Sedayao et al. | |
| 2012/0151477 A1* | 6/2012 | Sinha | G06F 9/45558 718/1 |
| 2012/0165614 A1 | 6/2012 | Strickland | |
| 2012/0278802 A1* | 11/2012 | Nilakantan | G06F 9/45558 718/1 |
| 2013/0013738 A1 | 1/2013 | Astete et al. | |
| 2013/0136126 A1 | 5/2013 | Wang et al. | |
| 2013/0238785 A1* | 9/2013 | Hawk | G06F 9/5072 709/224 |

* cited by examiner

DEFINING VIRTUAL APPLICATION TEMPLATES

CROSS REFERENCE TO OTHER APPLICATIONS

This application claims priority to co-pending U.S. patent application Ser. No. 13/174,213 for OPERATING VIRTUAL DATACENTERS, filed Jun. 30, 2011, which is incorporated herein by reference for all purposes. This application is related to co-pending U.S. patent application Ser. No. 13/248,372 for MANAGING VIRTUAL DATACENTERS, U.S. patent application Ser. No. 13/248,404 for PROVISIONING SOFTWARE SOLUTIONS TO VIRTUAL DATACENTERS, U.S. patent application Ser. No. 14/042,200 for REDUNDANT VIRTUAL DATACENTERS, and U.S. patent application Ser. No. 14/042,260 for PROVISIONING VIRTUAL APPLICATIONS FROM VIRTUAL APPLICATION TEMPLATES, which are incorporated herein by reference for all purposes.

FIELD

This invention relates generally to provisioning software in a cloud environment, and more particularly to a system and method for defining virtual application templates which may be used to provision virtual applications to secure virtual datacenters.

BACKGROUND

The cost, complexity, and time required to implement on-premise information management services often far exceeds their business value. Valuable resources may be consumed in tasks such as acquiring and racking hardware, installing software, configuring management and backup services, and testing the new environment. When adopting new information management services, it is necessary for users to ensure that the problem being solved is large enough to rationalize these expenses.

These challenges to the user may also be problematic for a supplier. Prospective customers may be hesitant to adopt new systems due to limited resources and exorbitant costs. This may decrease a supplier's income and directly impact their profits. Further, a supplier may be forced to continue offering services, such as technical support, for outdated systems. These services may divert valuable assets from more profitable ventures.

Technical support may present a further issue to the supplier because user environments may not be unique. Users may build these environments using a variety of different hardware and software options. Even when best practices documents are provided there is no way to ensure that users are complying with best practices. As a result, technical issues which never should have arisen may need to be addressed. Such situations may result in significant losses to both the user and the supplier.

Despite these obvious limitations to on-premise resource management solutions, off-premise solutions may not be practical for, or available to, all users. For example, a large corporation may be reluctant to use an off-premise solution because of security concerns. They may feel that a local environment can be better protected than a remote one. There may also be industry standards or regulatory requirements which demand the end user maintain certain levels of control.

There is a need, therefore, for an improved method or system for implementing, distributing, and managing information management systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
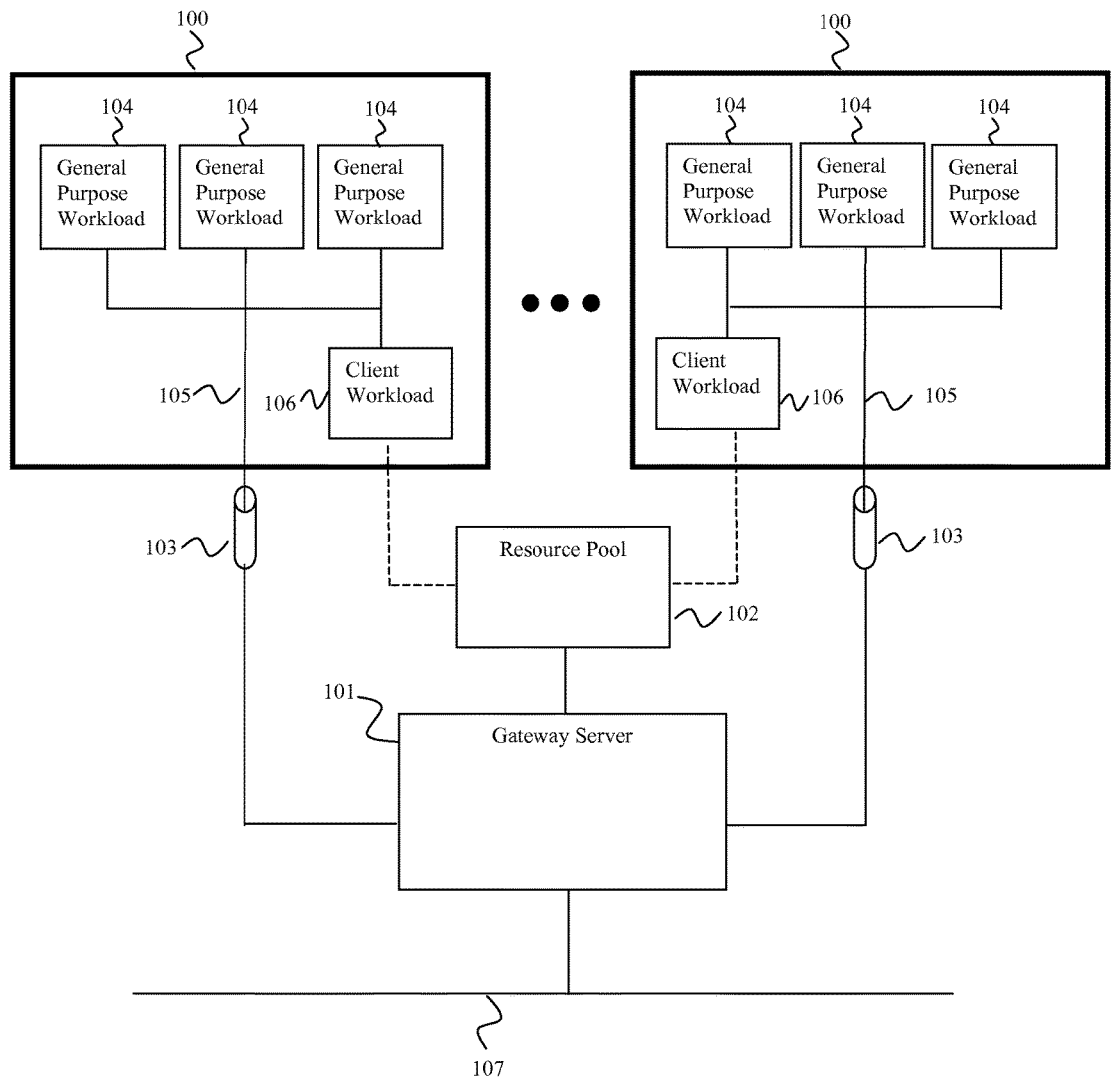
FIG. 1 is an overview of a virtual datacenter operations system consistent with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to data storage systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Virtual Datacenter Architecture

FIG. 1 is an overview of a virtual datacenter operations system. A plurality of general purpose workloads 104 and at least one client workload 106 may be created inside a virtual datacenter 100. Workloads 106 and 104 may communicate with each other across virtual network 105. Virtual network 105 could communicate with gateway server 101 via network tunnel 103. The gateway server 101 may be in communication with the external network 107 and resource pool 102. Resource pool 102 may be used to provision client environments 106 or other resources to users who access the gateway server 101.

In some embodiments, the virtual datacenters 100 may be VMware® "organizations" created using VMware's vCloudDirector, a product provided by VMWare Corporation, which is hereby incorporated by reference, among others. In some embodiments, the virtual network 105 may be created using the vCloudDirector tool, a product provided by VMWare Corporation, which is hereby incorporated by reference, among others. Organizations may be logical units used to manage users or groups. An organization may also be used to manage physical resources. These physical resources may include storage, memory, or processing assets, among others. For example, one organization may be provisioned to use a single processor, 1 GB of memory, and 1 TB of storage.

Workloads 104 and 106 may comprise one or more virtual machines. Workloads 104 may be server environments running Unix, Linux, Solaris, OS X, Windows Server, or the like. Client workload 106 may be any client environment, such as Windows Remote Desktop Service. Further, client and server environments may exist within the same virtual datacenter 100. This allows complete enterprise solutions to operate within virtual datacenter 100. For example, a single virtual datacenter 100 may have an application server workload, a web server workload, and a plurality of remote desktop client workloads 106 to interact with the two server workloads. A single virtual datacenter 100 may also contain development, test, and production environments running as workloads 104 or 106.

Embodying a client and server environment within a single virtual datacenter 100 may also enhance a solution's portability. Placing both of these environments in a single logical unit may allow them to be moved together rather than independently. If the environments are not contained in this way, a user may be forced to transfer one and then the other; a process that may become more complicated based on the number of environments involved. Placing both environments in a single datacenter can allow the transfer to be a single step process.

In some embodiments the virtual datacenters 100 may interface with one another. This could be accomplished by communicating over a virtual or physical network. In such an embodiment a first virtual datacenter 100 may access a service or application operating on a second datacenter 100. For example, three individual datacenters 100 could be configured to act as development, testing, and production environments. These virtual datacenters 100 could then communicate with each other to transfer content appropriately across the environments.

Alternatively or additionally, virtual datacenters 100 may be isolated from one another. For example, a first datacenter 100 could be deployed on a system which contains one or more additional datacenters 100. This first datacenter 100 may be completely unaware of, and unconnected to, the other datacenters 100 running in the system. This may be particularly beneficial if the first datacenter 100 contains sensitive content. It could also be desirable if a system contains multiple datacenters 100 provisioned to different users. For example, two different entities may have virtual datacenters 100 operating in the same environment. Isolating the virtual datacenters 100 may therefore serve to enhance the integrity of the system.

Virtual network 105 may communicate with gateway server 101 through network tunnel 103. Network tunnel 103 may be a VPN tunnel, SSH tunnel, or the like. Gateway server 101, in turn, may communicate with resource pool 102. Resource pool 102 can be associated with the client workloads 106 and may be used to provision resources to users accessing gateway server 101. These resources may commonly be client workloads 106, but are not limited to such. The resource pool 102 could also be used to provision other virtual resources, such as virtual machines, as well as physical resources, such as storage, memory, or compute resources.

In some embodiments, both gateway server 101 and resource pool 102 are managed using VMware's product VMware View. Gateway server 101 may be a View Security Server and the resource pool 102 may be a View Connection Server. Other gateway and resource provisioning tools may be used. The gateway and resource pool may operate on the same or separate hardware.

Virtual Datacenter Mobility

Figure 2:
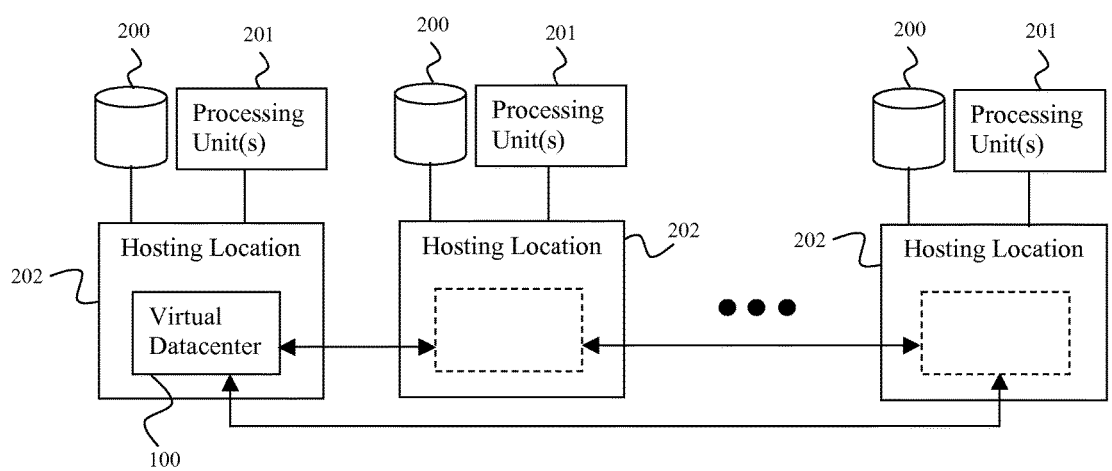
FIG. 2 is a diagram demonstrating the mobility of the datacenters consistent with an embodiment of the present disclosure.

FIG. 2 is a diagram demonstrating the mobility of the datacenters. Hosting locations 202 may be capable of hosting virtual datacenters 100. The hosting locations 202 may have access to storage 200 and processing units 201. The hosting locations 202 may also have access to other physical resources, such as memory.

Each hosting location 202 may be capable of hosting one or more virtual datacenters 100. The hosting locations 202 may be located at a variety of places, including on-premise or off-premise locations. Virtual datacenters 100 may be moved between hosting locations 202 as desired by the user, system administrator, or other authorized entity. In some embodiments, elements of a virtual datacenter 100 may exist on a variety of hosting locations 202. As a non-limiting example, a workload 104 or 106 which requires a large number of resources may be run at an off-premise location while the remaining workloads 104 or 106 are local. Transfer of the workloads may be accomplished through any means, including over a network or by using a physical storage device such as a flash drive.

This portability feature may be particularly beneficial to a user who is considering a hosted solution, but is not ready to commit. For example, a user who is interested in an off-premise hosting location 202, but is concerned about security, may choose to build a virtual datacenter 100 on local hardware. If at a later date the user chooses to adopt the off-premise solution, they can easily move their virtual datacenter 100 from the local hosting location 202 to the off premise one. Another reason a customer may wish to transfer their virtual datacenter 100 is if they suddenly need more compute or storage resources due to a business change. Rather than investing the time and money in purchasing and configuring new hardware, a user can simply push their virtual datacenter 100 to an off-premise hosting location 202 to instantly gain the needed resources. Conversely, the virtual datacenter 100 may also easily be moved from a remote location to a local one. The virtual datacenter 100 could also be transferred between on-premise machines or between off-premise machines as desired. As non-limiting examples, movement may be necessary if an accident occurs, if there are security concerns about a given location, or in the event of a natural disaster.

In some embodiments, a virtual datacenter may be replicated between datacenters as discussed in detail below. When a customer wishes to "move" a virtual datacenter, that virtual datacenter may simply be deactivated on one host and reactivated on another. For example, as a user interacts with and makes changes two a virtual datacenter 100 operating on hosting location 202, those changes may be communicated to one or more additional hosting locations. The additional hosting locations may replicate the changes on a local copy of the virtual datacenter. When a customer indicates they wish to "move" a virtual datacenter to a new location, that virtual datacenter may be deactivated on the old host and reactivated (i.e. booted up) on the new host. This allows a movement to happen gradually over time, appears to the user that the move happens instantaneously, and may improve disaster recovery. This process is discussed in further detail below.

Figure 3:
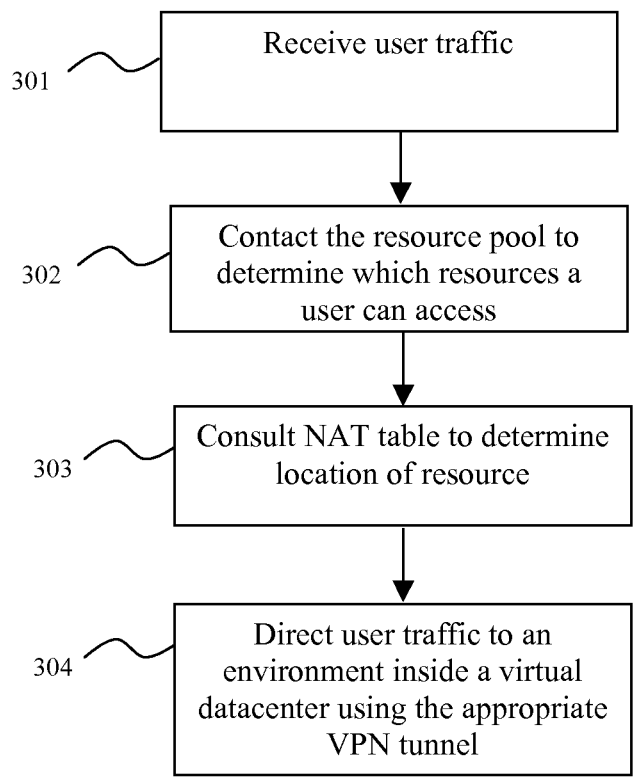
FIG. 3 is a flow chart illustrating the role of a gateway and resource pool consistent with an embodiment of the present disclosure.

FIG. 3 is a flow chart illustrating the role of the gateway server 101 and resource pool 102 in an embodiment. At 301 the gateway server 101 receives user traffic. At 302 the gateway server contacts the resource pool 102 to determine which resources the user is allowed to access. At 303 the gateway server 101 attempts to determine the location of the provisioned resource. Once a resource has been located, the user traffic is directed to it at 304.

When determining the location of a resource the gateway server 101 or resource pool 102 may use Network Address Translation (NAT) Tables or a similar technology. The NAT mapping can be used to direct users through a network tunnel 103, such as a VPN tunnel, linking the gateway server 101 to the provisioned resource. This resource may be a client workload 106 which exists inside a virtual datacenter 100.

The gateway server 101 and resource pool 102 may also aid in the portability and management of the virtual datacenters 100. In some embodiments, these elements exist independent of the virtual datacenters 100. A user can move their virtual datacenter 100 between hosting locations 202 and still access that environment through the same gateway server 101. This could be accomplished by updating a NAT table or other routing mechanism. Further, one gateway server 101 and resource pool 102 can be used to manage a plurality of virtual datacenters 100. For example, a supplier can create multiple virtual datacenters 100 on their hosting location 202. The supplier could then assign these virtual datacenters 100 to different users who can transfer them as desired. The supplier could still access these environments as necessary though the gateway server 101. Such access could be used to conduct maintenance on the virtual datacenters 100 or to ensure best practice policies are enforced.

In an embodiment, virtual datacenters are isolated from one another. In such an embodiment the individual datacenters may have no communication with the other datacenters and may be unaware of their existence. Alternatively or additionally, some virtual datacenters may interface with each other. This interface could occur, for example, through the use of a physical or virtual network. In such an embodiment one virtual datacenter could access services running on another virtual datacenter. These services could include security services, management services, or file transfer services.

In an embodiment, the gateway server 101 and resource pool 102 may be secured by a firewall. This firewall aids in preserving the integrity of the system and the underlying virtual datacenters. The firewall could be established, for example, through the use of VMware's vShield technology. vShield Edge could be used to secure the gateway server 101 or individual virtual datacenters 100. vShield could also be leveraged to protect individual workloads 104 and 106 within a datacenter. vShield App, or a similar technology, may be used to monitor network traffic on the virtual network 105 which connects the workloads 104 and 106 together and to the gateway server 101. Other technologies could also be used to protect individual workloads 104 and 106. These technologies could be used to firewall workloads 104 or 106, virtual machines inside those workloads, or virtual network 105.

Figure 4:
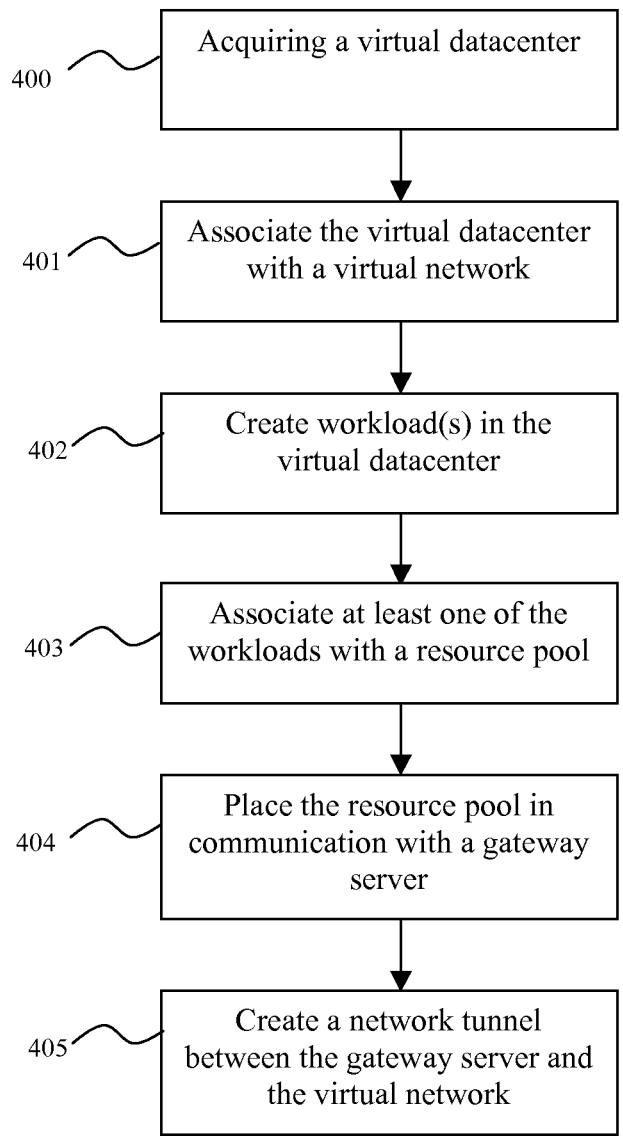
FIG. 4 is a flow chart illustrating the creation and operation of a virtual datacenter consistent with an embodiment of the present disclosure.

FIG. 4 is a flow chart illustrating the creation and operation of a virtual datacenter 100. At 400, a virtual datacenter 100 is acquired. In an embodiment, the virtual datacenter 100 may be acquired by building an "organization" using VMware's vCloudDirector tool. At 401 the virtual datacenter 100 can be associated to a virtual network 105. At 402, a plurality of workloads may be created within the datacenter. To facilitate portability, one of the workloads may be a client workload 106, such as a remote desktop server. Each of these workloads may be in communication with the virtual network 105. At 403 at least one of the workloads can be associated with a resource pool 102 which may later be used to provision environments to users. At 404 the resource pool 102 can be placed in communication with a gateway server 101, wherein the gateway server may be connected to an outside network 107. At 405 a network tunnel 103 could be created between the gateway server and the virtual network.

Virtual Datacenter Management and Provisioning

Figure 5:
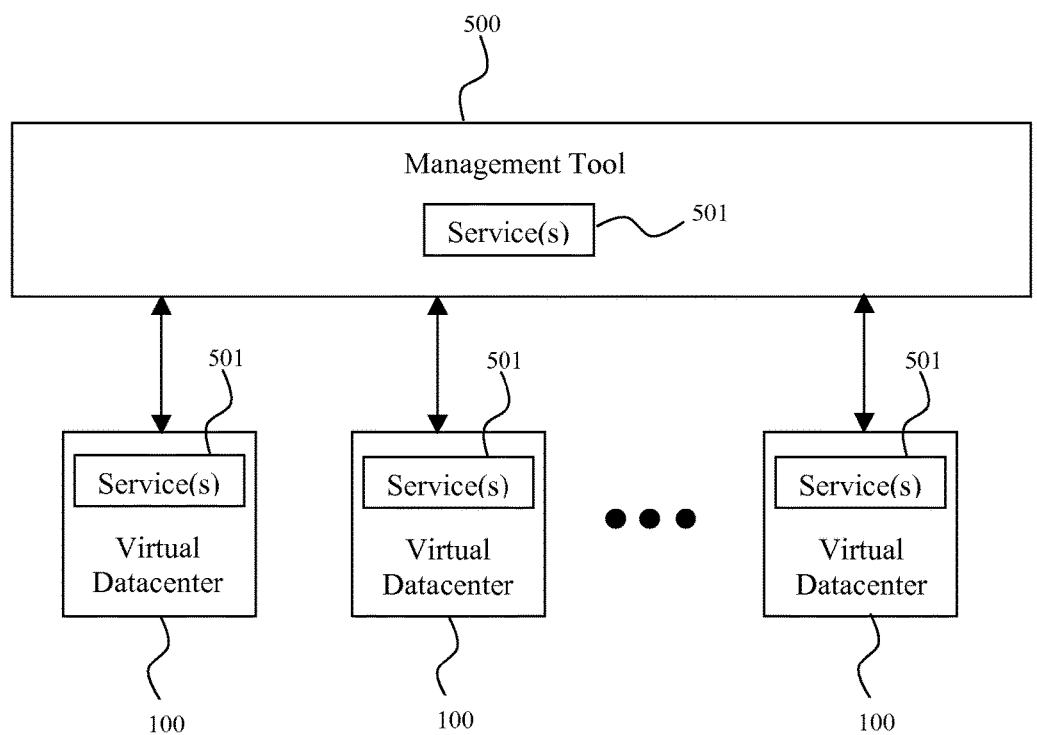
FIG. 5 is an overview of a virtual datacenter management system consistent with an embodiment of the present disclosure.

FIG. 5 is an overview of a virtual datacenter management tool. Management tool 500 is in communication with a plurality of virtual datacenters 100. The management tool 500 and virtual datacenters 100 may have one or more system services 501 running on them. These services may be accessed and managed using the management tool 501. Management system 500 may be run on a general or specific purpose computing device, and may be implemented in either hardware or computer readable code.

The management tool 500 may run on the same hardware environment as one or more virtual datacenters 100. Alternatively or additionally, it may run on discrete hardware from the virtual datacenters 100. The physical location of the hardware running the management tool 500 may be independent of the location of the virtual datacenters. The management tool 500 may maintain communication with the virtual datacenters 100 and their services 501 regardless of where the components are located. For example, if a virtual datacenter 100 is created on an off-premise hosting location 202 and is later moved by a user to an on-premise environment, the management system 500 could still access that datacenter. This allows users to freely move virtual datacenters 100 while managing them from a central location. This communication may be any form of digital or analog communication, such as a network connection.

The management tool 500 may provide a standard user interface for interacting with the services 501 and the virtual datacenters 100. Alternatively or additionally, a plurality of separate user interfaces may be provided. This interface could be displayed in a web browser or in a standalone application. The interface could be used to access virtual datacenters 100 or services 501 running inside them. The interface could differ based on the type of user accessing it. As a non-limiting example, a service provider may be presented with options relating to the creation and deployment of virtual datacenters 100. The service provider may not, however, be able to access the data inside the virtual datacenter 100 after deployment. A user, in contrast, may use the interface to access their virtual datacenter 100, but not to create and deploy new ones. Alternatively or additionally, a service provider could maintain complete or partial access to a deployed virtual datacenter 100 and all of its services 501. Similarly, a user may leverage the interface to create or deploy new virtual datacenters 100.

In an embodiment, services 501 running in virtual datacenters 100 may be comprised of service agents installed in one or more workloads 104 or 106. For example, a virtual datacenter 100 may have a workload 104 or 106 comprised of a single virtual machine running antivirus software as a service agent. This agent could be configured to protect one or more workloads 104 or 106 or the virtual datacenter 100 as a whole. This agent may be exposed to the management tool 500 over a physical network, virtual network 105, or network tunnel 103. A user of the management system 500 could therefore monitor the service agents of a plurality of virtual datacenters 100 by accessing the management tool 500. In addition to antivirus software, other applications could include, but are not limited to, anti-malware, application health, resource monitoring, firewalls, network monitoring, intrusion detection/prevention, data loss prevention, identity management, authentication, authorization, role-based access control, backup, email and other messaging services, batch job management, and file transfer.

The services 501 and management tool 500 may be leveraged to provide different functionality to the virtual datacenters 100. One example is patch deployment. As noted above, virtual datacenters 100 may have different software products installed on them. Periodic patches may be released for these software applications. Given the distributed nature of the virtual datacenters 100, however, it may be difficult to update these products. In an embodiment, these patches are deployed using the management tool 500 and the services 501 running on the virtual datacenters. This deployment could occur in several ways. For example, deployment could occur by directly transferring the patch from the management tool. The patches may also be deployed by issuing an instruction to the virtual datacenters 100 to download it from another source.

In an embodiment patch deployment uses a tiered risk approach. Different patches may be assigned different priority levels. If a patch has a high priority, it may be automatically distributed to the appropriate virtual datacenters 100. If a patch has a lower priority, it may only be distributed at a user's request. VMware's Configuration Manager may be used to manage this patching process.

The services 501 may also be used in conjunction with the management tool 500 to monitor physical and virtual resources. For example, the services 501 could monitor the health and utilization of hardware and the virtual infrastructure. This virtual infrastructure could include, but is not limited to, virtual datacenters 100, workloads 104 and 106, virtual machines, virtual networks 105, or network tunnels 103. Resources to be monitored may include, but are not limited to, processing, memory, network, and storage capacity. In an embodiment, customized plugins may be developed to monitor specific resources. These plugins may be distributed to one or more workloads 104 or 106 using the management tool 500. VMware's Hyperic or Operations Manager may be used to perform this monitoring or analysis.

In an embodiment, the monitoring may be used to determine when additional resources are required. Projections may be created to predict when an upgrade may be necessary. These projections may be based on a variety of factors, including, but not limited to, current usage trends or user entered expectations. VMware's Capacity Management tool may be used to make these projections. Alternatively or additionally, the monitoring may determine when resources are being underutilized. The service 501 may then either raise a user alert or automatically reallocate the resources to new tasks or locations.

The monitoring service may also be used to generate reports regarding resource use. These reports could be customized to specific users or environments, or may be standardized. The reports may be generated periodically or on demand. The reports could provide information about which virtual datacenters 100 are consuming which resources. Monetary values may be allocated to this resource consumption, or the reports could be used for administrative purposes. VMware's Charge Back product may be used for generating these reports.

The services 501 may also be used to monitor changes to the virtual infrastructure. These changes may be recorded in a database or other location for analysis. Change monitoring may be used to record issues and why specific configuration changes were made. It may also be used to detect abnormal activity which may indicate part of the system is compromised. Change monitoring may interact with a variety of other services, including patch deployment, resource monitoring, issue tracking, or security services.

The services 501 may also be used for user authentication. User authentication may occur upon access to the management tool 500 or to the virtual datacenters 100 themselves. Authentication mechanisms may be Active Directory or LDAP. They may also leverage a single sign on (SSO) technology. In an embodiment, a multi-factor authentication mechanism is used. For example, a user may be required to login using a username, password, and rotating pin. RSA's SecurID may be used to provide the multi-factored authentication.

In an embodiment, the management tool 500 and services 501 may be used for policy enforcement. A user may use the management tool 500 to create one or more policies to be enforced on the virtual components, applications, or operating systems. These policies may be templates detailing specific settings for adherence. The templates may be passed from the management tool 500 to different virtual datacenters 100. If a discrepancy is found between the policy and the settings in the system, a user alert may be raised. Alternatively or additionally, the discrepancy may be automatically corrected. For example, a policy could be created instructing all firewalls to prohibit traffic over a specific port. If a firewall is found to be violating that policy, the port may be automatically closed and the appropriate users may be notified.

In an embodiment, the policy services may be used to ensure that all products in a virtual datacenter 100 adhere to a supplier's best practices. Using the management tool 500 to distribute these policies allows enforcement to occur from a central location. An administrator does not need to access a plurality of environments individually to ensure policy compliance. Instead, they can define the policies once and distribute them to all the virtual datacenters 100 in the system. Given the virtual nature of the datacenters 100, the policies may also be used to enforce hardware best practices. For example, it may be recommended that a given product run on three processors. If a virtual datacenter 100 only has two available processors, a new one may be instantly added to comply with the best practices policy. In a physical environment, a relatively significant amount of time and expense would be required to comply with the policy. This time and expense may increase significantly based on the number of systems that need to be modified. VMware's Configuration Manager may be used to control this remediation process.

Figure 6:
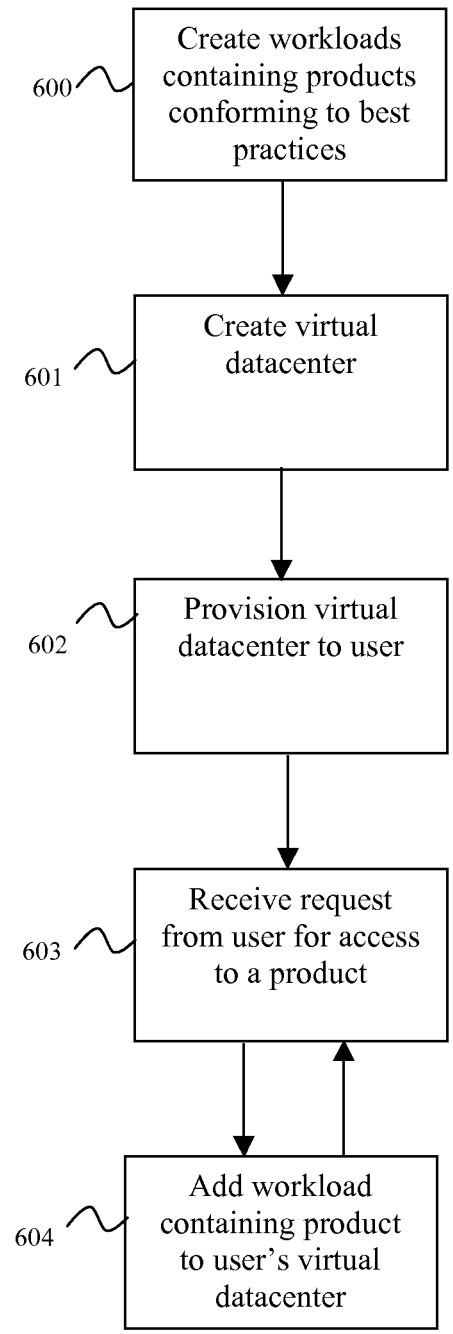
FIG. 6 is a flow chart illustrating granting users access to various products inside their virtual datacenter consistent with an embodiment of the present disclosure.

FIG. 6 is a flow chart illustrating provisioning software solutions to datacenters in a computer system. At 600 a plurality of workloads containing different software solutions may be created. These solutions may comply with a supplier's best practices. At 601 a virtual datacenter 100 can be created and at 602 this virtual datacenter 100 may be assigned to a user. At 603 a user can request access to a software product from an authorized entity. At 604 one of the workloads containing the desired product could be transferred to the user's virtual datacenter 100. New workloads may be created at any time, before or after creation or deployment of a virtual datacenter 100, or as new products are released. 603 and 604 may be repeated as often as necessary to grant a user access to products embodied in workloads.

Transferring preconfigured workloads to a user's virtual datacenter 100 has numerous advantages. It may significantly reduce time and monetary expenses because there is limited need for the user to purchase and configure new hardware. This method may also reduce the need for the user to install and configure the desired software in a new environment. Further, it could ensure that best practices are always followed because the workloads may be configured by the service provider.

Creation and distribution of preconfigured workloads may be facilitated using the management tool 500. This allows the entire provisioning process to occur from a central location. It also allows workloads to be transferred to any virtual datacenter 100 regardless of its location. Leveraging management tool 500 has the further advantage of allowing the service provider to monitor the health and status of the product contained in the workload as it runs in the user's virtual datacenter 100. This may enhance service areas such as customer support because the service provider could quickly access and troubleshoot malfunctioning products. The management system 500 can also be used to ensure that delivered products are always up-to-date. If the service provider can access a user's system, they can automatically install patches and updates as required. This again serves to ensure that product best practices are always followed.

In an embodiment, preconfigured workloads may be placed in a user's virtual datacenter 100 prior to their request. For example, a supplier could install a plurality of preconfigured workloads in a user's virtual datacenter 100 prior to provisioning the datacenter to the user. The workloads could be access restricted so that the user can only access ones they have requested. This may further reduce distribution time because there is no longer a need to transfer a workload at the user's request. All the supplier needs to do is grant the user permission to access that workload. As new products are released they could automatically or manually be transferred to the user's virtual datacenter 100. This embodiment may provide nearly instantaneous access to any product the supplier provides.

The workloads 104 and 106 and their software solutions may be preconfigured to interface with one another. For example, three separate workloads 104 and 106 may embody development, testing, and production environments. These environments may each have a software promotion application used to promote software packages from one environment to the next. This may allow a developer to create his code in the development workload, promote it to the test workload, and ultimately promote it to the production workload. The promotion software application on each of these workloads 104 and 106 may be pre-configured to interface with each other. A user could therefore start the development process with only the development workload.

When it is time for testing, he may request the testing workload. When the testing workload is provisioned to his virtual datacenter, it may automatically connect to the development workload without further configuration. Similarly, the production workload may be provisioned and utilized without costly configuration tasks.

Workloads 104 and 106 may be distributed separately or in conjunction with each other. For example, a user who wishes to create a web application may request a web server workload and an application server workload. A user who wishes to only create a homepage, however, may request only the web server. If at a later date this user decides to develop a web application, he may request the application server as well. In an embodiment, the application server will automatically interface with the web server when the second workload is downloaded.

In an embodiment, workloads and software solutions may communicate across virtual datacenters 100. For example, one virtual datacenter 100 may be designed to hold only a database. This may be advantageous to a user who prefers segmented environments. A second virtual datacenter 100 may be designed to host a web application, such as a content management system. The web application may require access to the database running in the first virtual datacenter 100 to retrieve specific content. The workloads 104 and 106 of the virtual datacenters may communicate with one another to retrieve this content.

Application Management and Provisioning

As discussed above, the methods, systems, and processes discussed herein may be used to distribute complete software solutions, or "virtual applications." Virtual applications may include enterprise software products designed to run on multiple environments, and therefore require multiple workloads. In an embodiment, an administrator may create virtual application templates that define and/or contain both the necessary workloads and application configuration settings, such as access controls, scripts, and service accounts. These templates may be used to distribute the virtual application to customer virtual datacenters in a secure, prompt, and efficient manner.

In some embodiments, multiple workloads may be grouped together in a one or more virtual datacenters to form a virtual application. For example, a customer, also called a "tenant" herein, may decide to start an online store. A portal, such as management system 500, may provision a virtual application named "store" to the tenant. In an embodiment, this virtual application may comprise three workloads: a web server workload for hosting the site, an application server workload for hosting the store web application, and a database workload comprising a database for holding customer information and/or product information. The store application may, however, require more than standard workloads to operate.

Once workloads comprising a virtual application are provisioned into a tenant's virtual datacenter, further configuration may be necessary to enable them to communicate with each other and operate properly. For example, an application server workload may need to know how to communicate with and retrieve information from a database workload. Additionally or alternatively, a series of scripts may need to operate on the database workload before connecting to the application server workload. Further, all of these operations may require special accounts with different permissions, such a super-user account with super-user privileges.

While these operations may all be programmed directly into the workloads prior to provisioning, such an approach may create security risks. For example, if the "store" application is provisioned to two separate tenants, each tenant should have unique accounts for operating their virtual application. One tenant should not have access to the other tenant's virtual application, nor should the operation of a virtual application by one tenant interfere with operation by another tenant. The embodiments discussed herein demonstrate how these virtual applications may be defined and provisioned to tenant virtual datacenters in a secure and automated manner.

Figure 7:
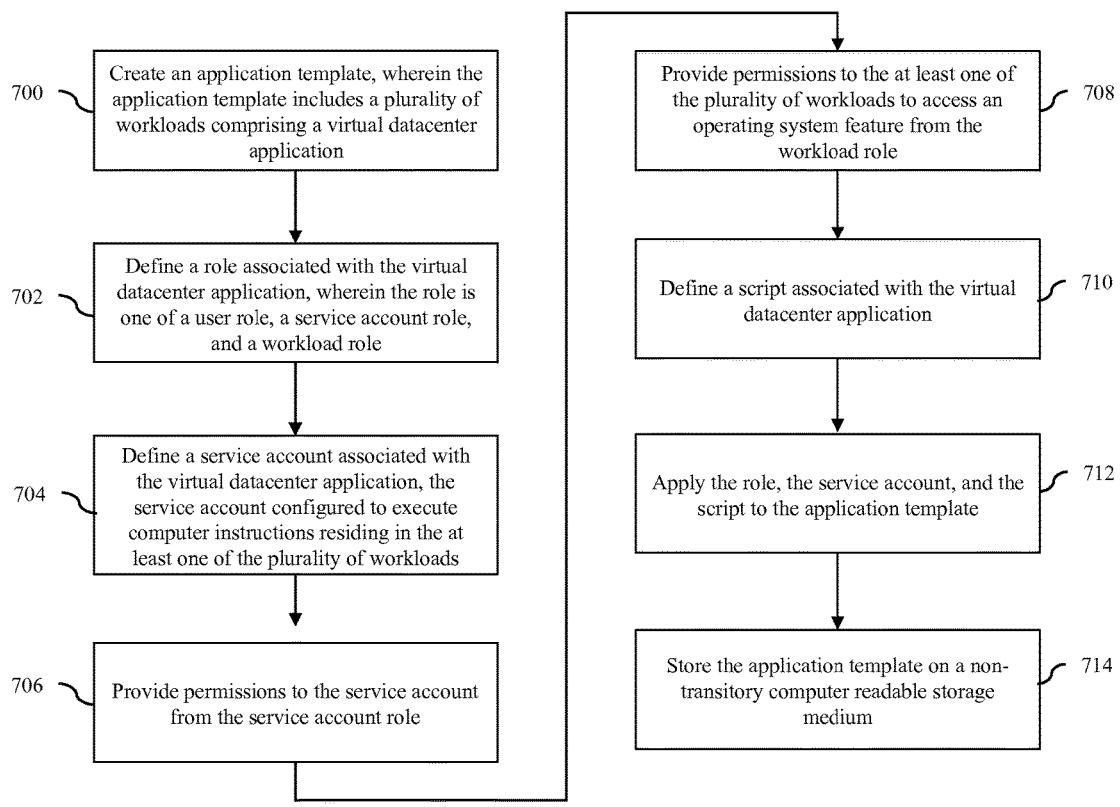
FIG. 7 is a flowchart for defining virtual application templates consistent with an embodiment of the present invention.

FIG. 7 depicts a flowchart for defining a virtual application comprising one or more workloads. At 700, an application template may be created. This template could be created, for example, using management tool 500. In an embodiment, the template may identify the workloads necessary to deploy the virtual application, as well as necessary configuration settings such as access controls, scripts, and required service accounts. For example, if the template is for the "store" application discussed above, the template may specify that the virtual application needs a database workload, an application server workload, and a webserver workload. These workloads together, once deployed, may comprise the virtual application.

At 702, various roles associated with the virtual application may be defined and associated with the template. These roles may be security roles necessary to operate the virtual application. Additionally or alternatively, the roles may manage access to a workload or infrastructure resources required to run a workload. In an embodiment, the roles may be managed by an active directory system that may be operating on a workload in the virtual application, a workload separate from the virtual application, the management tool 500, and/or the physical system hosting a tenant's virtual datacenter. Roles may include, for example, user roles, service account roles, and/or workload roles, among others.

User roles may comprise user accounts used to access different features in the workloads. In an embodiment, they may comprise end-user accounts, such as customers trying to make a purchase through an online store. Additionally or alternatively, they may comprise tenant user accounts. For example, a web developer may be assigned a user role that he may use to access web applications operating on an application server workload. Similarly, an administrator user role may be able to access logs residing on different workloads and deploy new software to those workloads. In other words, user roles may be understood to manage role-based access control to the workloads and/or virtual datacenters.

Service account roles may grant service accounts permission to execute scripts, access services 501, and/or communicate between two or more workloads. A service account, in contrast to a user account, may be used to run and manage system processes between two or more workloads. For example, a service account may manage a handshake procedure between two workloads. Service accounts are discussed in further detail below, but for the purposes of role management they may be substantially similar to user accounts.

At 704, a service account may be defined. In an embodiment, this service account may be configured to execute computer instructions residing within a workload. For example, the service account may be configured to execute a workload binary and/or script that establishes a connection with a second workload. In some embodiments, the computer instructions may be the scripts defined at block 710 and discussed in detail with reference to FIG. 8.

At 706 the service account may be associated with the service account role created in block 702. This service account role may provide permissions to the service account to perform various operations. For example, if a service account needs to communicate between two workloads, the service account role may provide the requisite permissions for doing so.

In some embodiments, service accounts may be tenant specific and managed by an active directory service. For example, a given virtual application may have a group in active directory. This group may define application specific policies, such as Windows group policies, to be applied to the virtual applications. When a service account is created for a given tenant, the service account may be added to the virtual application's group. This allows the service accounts to be secure to a given tenant, but still have common virtual application permissions. If this grouping mechanism were not used, an administrator may need to define policies for every service account for every tenant as the service accounts were created. It should be noted, however, that the tenant specific service accounts are created when the virtual application is provisioned to the tenant, as discussed below, while the process discussed in reference to FIG. 7 describes what is necessary for the virtual application to run.

At 708, the workload role may provide permissions to a workload to access operating system features defined by operating system policies. In an embodiment, a workload role may be associated to a group in active directory. That active directory group then becomes associated to a set of active directory group policies that govern how any operating system instances associated to that group will function. Next, when a workload is provisioned, a computer host may be registered with the active directory domain. The active directory domain may create a computer object in the active directory forest. That computer object may then be associated to the active directory group containing the group policies. Upon workload reboot, the group policies associated with the workload are automatically downloaded and applied to the workload so that it assumes the correct operating system policies for running that workload.

At 710, a script associated with the virtual application may be defined. Workloads may execute scripts at specified times or events, such as boot-up or shut-down. In an embodiment, scripts are executed using the service account defined at 704 and/or using the workload role discussed at block 708. Scripts are discussed in further detail in reference to FIG. 8.

At block 712, the role, service account, and script may be applied to the application template. For example, the role may be a service account role used by the service account to execute a script residing on the workload.

Finally, at 714, the role, service account, and script may be associated with the virtual application template and stored to a non-transitory computer readable storage medium. Any time a tenant requests the virtual application be provisioned to their virtual datacenter, the template may be loaded and used to control the deployment. This provisioning process is discussed in further detail below.

Figure 8:
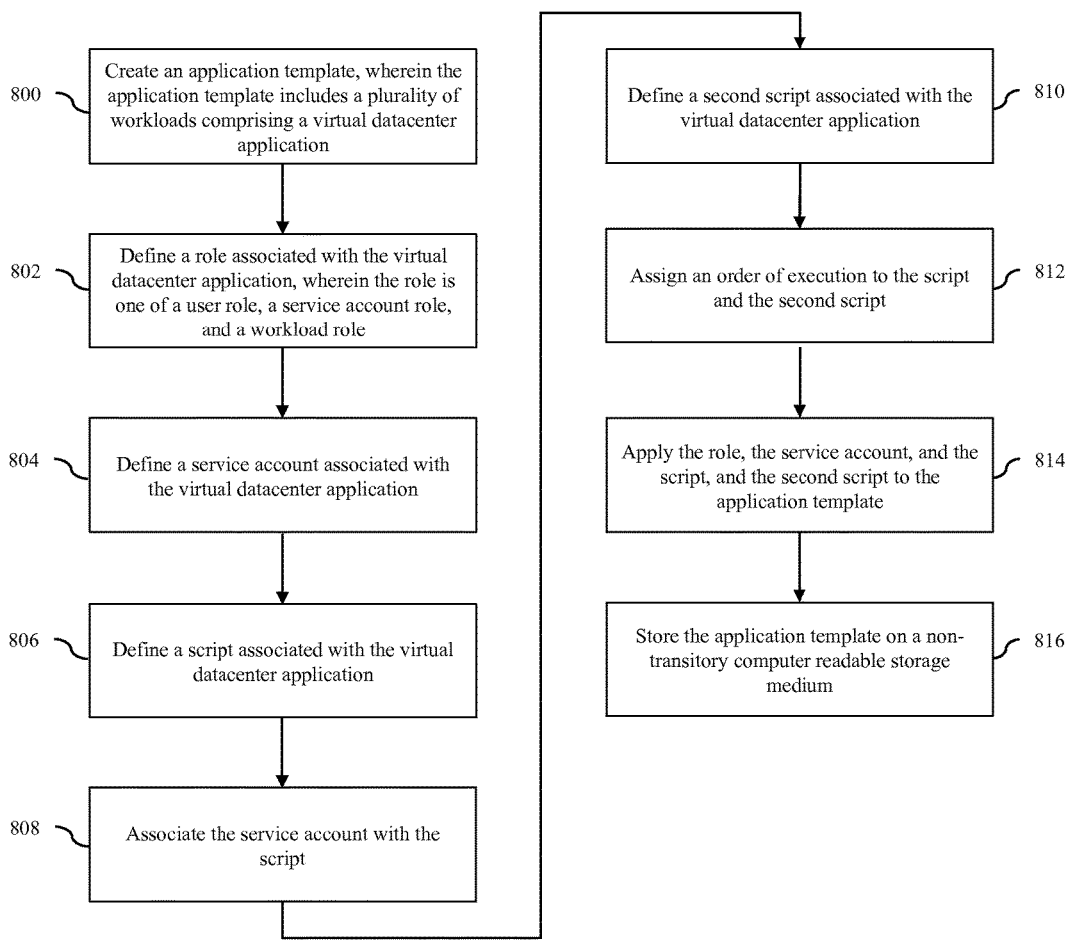
FIG. 8 is a flowchart for associating scripts with virtual application templates consistent with an embodiment of the present invention.

Turning now to FIG. 8, the scripts are discussed in further detail. Scripts may be used to perform various specialized operations within a workload. For example, the script may be a command line script which uses a service account to establish a communication between two workloads. In some embodiments, blocks 800-804 are substantially similar to blocks 700-704, and block 806 is substantially similar to block 710.

At block 808 a script may be associated with a service account. This association could be made, for example, using a management tool such as management tool 500. In an embodiment, associating a script with a service account may allow the script to execute using the active directory policies described above. The association between the script and the service account may therefore guarantee that the script is executed on the correct workload with the proper permissions for the appropriate tenant.

At block 810 a second script may be defined, and at 812 an order of execution may be assigned to the first script and the second script. It may be preferable, for example, to execute the first script before the second script. It should be appreciated that any number of scripts may be created and applied to a given virtual application template. In some embodiments, the order of execution may be organized over multiple workloads. For example, a script for a database workload may be executed first, and that workload may be rebooted after a successful execution. The next script may be associated with an application server workload, which may wait until the database workload is back online before executing.

In addition to an execution order, a plurality of additional options may be applied to the scripts. These options may include checking to ensure a script completes successfully before continuing to the next script, rebooting a workload after/before execution, and restarting the script in the event it fails. Additionally or alternatively, script processes and errors may be logged for debugging in the event of an error. When a script is restarted, for example after an error is resolved, the scripting engine may exclude scripts that already completed successfully, execute the script that failed first, and continue on if the execution is successful.

Figure 9:
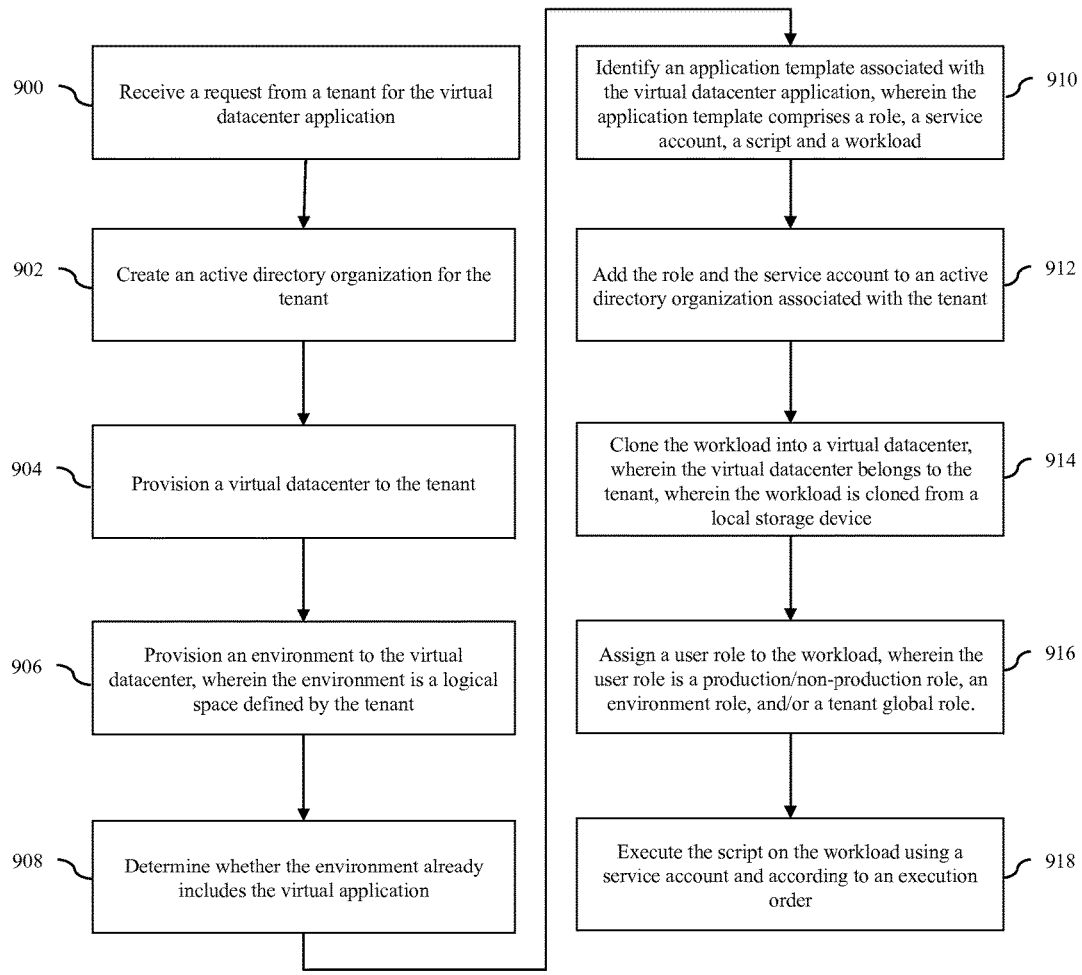
FIG. 9 is a flowchart for provisioning virtual applications from a virtual template consistent with an embodiment of the present invention.

Using the process described in reference to FIG. 7 and FIG. 8, a system administrator or architect may define a template defining required elements of a virtual application. The template may describe the workloads, roles, scripts, and service accounts needed by the virtual application in a virtual datacenter. Turning now to FIG. 9, a method and process for provisioning the virtual application using the virtual application template will be discussed.

FIG. 9 depicts a method for distributing a virtual application using a virtual application template. At block 900, a request may be received from a tenant for a virtual datacenter application. This request could be, for example, received at a portal or management tool, such as management tool 500. In an embodiment, the request may result from a tenant making a purchase on an application store. For example, the tenant could decide they wish to purchase a document management system, such as EMC® Documentum®, and place the order in an online store. Workloads comprising the Documentum application may then be provisioned to the tenant's virtual datacenter.

At block 902, a check may be made to determine whether the tenant has an active directory organization. The active directory organization may not exist, for example, if this is a new tenant. If the tenant does not have an active directory organization, one may be created using the management tool. The active directory organization may manage all the tenant's customer user accounts, customer roles, and customer service accounts. The active directory service managing the organization may operate in a workload, on the management tool, or in a management virtual datacenter.

At block 904, a check may be made to determine whether the tenant has a virtual datacenter. If the tenant is new, they may not have a virtual datacenter and one may be provisioned in a manner substantially similar to the process described above. If the tenant does already have a virtual datacenter, they may be prompted to confirm they wish to have the virtual application deployed to that virtual datacenter. Additionally or alternatively, a new virtual datacenter may be provisioned to the tenant for the purpose of hosting the virtual application. Should a new virtual datacenter be provisioned, the tenant may specify a hosting location.

At block 906, environments may be provisioned to the virtual datacenter, where the environments are local spaces defined by the tenant. For example, the tenant may specify that a virtual datacenter should comprise one or more environments, such as "development," "test," "staging," and "production." In an embodiment, these environments may not be individual workloads. Instead, they may be logical spaces within the virtual datacenter. Each logical space may be capable of hosting workloads. In an embodiment, the workloads in one logical space may be unaware of workloads in another logical space, even though they are provisioned to the same tenant in the same virtual datacenter. Additionally or alternatively, the workloads may be able to communicate across the logical spaces.

At 908, the tenant may identify the environment they wish to provision the virtual application into, and a check may be made to determine whether that environment already has that virtual application. In some embodiments, virtual applications may only be provisioned into a given environment one time. If the environment already contains the virtual application, the environment may not be presented to the user as an option. Deploying the virtual application one time prevents conflicts between virtual applications. For example, if the same virtual application was provisioned to the same environment twice, there may be conflicts between host names automatically constructed for each environment. Additionally or alternatively, there may be network errors on the virtual datacenter's virtual network. Deploying the virtual application one time per environment may limit these complications.

At block 910, an application template associated with the virtual application may be identified. The application template could be, for example, defined using a process substantially similar to that described in FIG. 7 and FIG. 8. The virtual application template may comprise a role, a service account, a script, and/or a workload. In some embodiments, the virtual application template may comprise multiple roles, service accounts, scripts, and/or workloads.

At 912, the role and service account may be added to the active directory organization associated with the tenant. As discussed above, the role may be a user role, service account role, and/or tenant role. In some embodiments, a virtual application may have multiple roles and multiple service accounts, and they may all be added to the customer's active directory organization. This allows all the permissions necessary to operate the virtual datacenter to be created automatically in a single step.

As noted above, the service account may also be added to an active directory group associated with the virtual application. If multiple tenants have the same virtual applications operating in their virtual datacenters, each tenant may have their own virtual application service accounts in their active directory organization. These service accounts may also, however, be added to the virtual application's active directory group. This allows the service accounts to be unique and secure to each tenant, while also be managed from a centralized location. If any individual service account is compromised, it is only compromised for that tenant. Changes to virtual application policies, however, may be made at the virtual application's group so that they are instantly applied to all the virtual datacenters, regardless of tenant.

At block 914, the workload defined in the virtual application template may be cloned into a tenant's virtual datacenter from a local non-transitory computer readable storage device. Cloning the workload locally, rather than transmitting the workload over a network from the management tool or other location, may improve provisioning time. In some embodiments, a workload may be several gigabytes large. Transmitting such a file over a network may take a significant amount of time compared to simply cloning the workload locally. In an embodiment, physical hosting locations, such as locations 202, may include a local store containing various workloads. When the virtual application is provisioned to a virtual datacenter residing on those locations, the requisite workload may be copied from that local store.

At 916, user roles are assigned to a provisioned virtual application. The user roles may define a set of user specific permissions with varying degrees of granularity. For example, the user role may be a "tenant global" role, which secures the workload at a tenant level. The tenant global role applies the same user roles across all the workloads belonging to the tenant. For example, a user with administrator permissions will have those administrator permissions for every workload in the virtual datacenter.

Additionally or alternatively, the user role may be production/non-production specific. If a virtual application is provisioned using this role, permissions granted to the user will be restricted to either all production or all non-production environments. This role may be useful when a tenant has multiple production and non-production environments, but different administrators for each. The production/non-production role allows a given user to have administrator permission across all production or non-production environments, without needing to set up individual permissions for each.

In some embodiments, the user roles may be environment specific. If a user is granted permissions in one environment, those permissions are restricted to only that environment. This may be beneficial for tenants with multiple environments distributed among business units. It may not be desirable, for example, for an administrative user from one business unit to have administrator permissions in another business unit's environment.

Finally, at 918, at least one script associated with the virtual application template may be executed. In some embodiments, these scripts may be executed pursuant to an execution order or under specified conditions, as discussed above. The scripts may be executed using the proper service accounts associated with the given tenant. In some embodiments, the scripts may be monitored for successful execution and restarted in the event of an error. Additionally or alternatively, the scripts may be restarted from the point-of-error so that successful work is not replicated.

This process allows an entire virtual application to be established in a tenant environment without human intervention. The tenants and virtual datacenters may be provisioned automatically, the workloads may be cloned, necessary roles and accounts may be added to active directory, and scripts may be executed. As a result, deployment time may be a matter of hours, rather than days, and potential human errors are eliminated.

Disaster Recovery and Redundancy

Several of the features discussed herein may be combined to provide virtual datacenter ("VDC") redundancy and/or disaster recovery capabilities. These features may be used to quickly and/or instantaneously recover a virtual datacenter in the event of a disaster.

As discussed above, tenants may have preferred hosting locations for their virtual datacenters. For example, a tenant may desire a hosting location to be close to the virtual datacenter's primary user base to decrease network latency. A European tenant may desire their virtual datacenters to reside solely in countries belonging to the European Union to comply with data privacy laws. Another tenant may prefer to keep their virtual datacenter out of a country with unscrupulous snooping or data monitoring policies.

While individual tenants may have different preferred hosting locations, there is no guarantee that a given location will always be available. Technical errors, natural disasters, wars, riots, or acts of God may render a given location inaccessible at any time. Depending on the nature of the disaster, a hosting location may be offline for a brief period of time or may be permanently destroyed. The system and methods discussed herein may ensure that in the event of such a disaster, a tenant will nevertheless be able to access their virtual datacenter and its provisioned applications and/or workloads.

In an embodiment, virtual datacenters will be replicated between two or more hosting locations. Changes made to a virtual datacenter operating at one hosting location may be transmitted to a second location hosting the virtual datacenter's replica. The changes may thereafter be applied to the replica to ensure both the original virtual datacenter and that datacenter's replicas are substantially identical. In an embodiment, only one of the virtual datacenters may be active at any given time. In the event of a disaster at the active virtual datacenter's hosting location, one of the replica virtual datacenters may be activated. Since the virtual datacenters are substantially similar, the recovery time may appear to the end user to be rapid.

Figure 10:
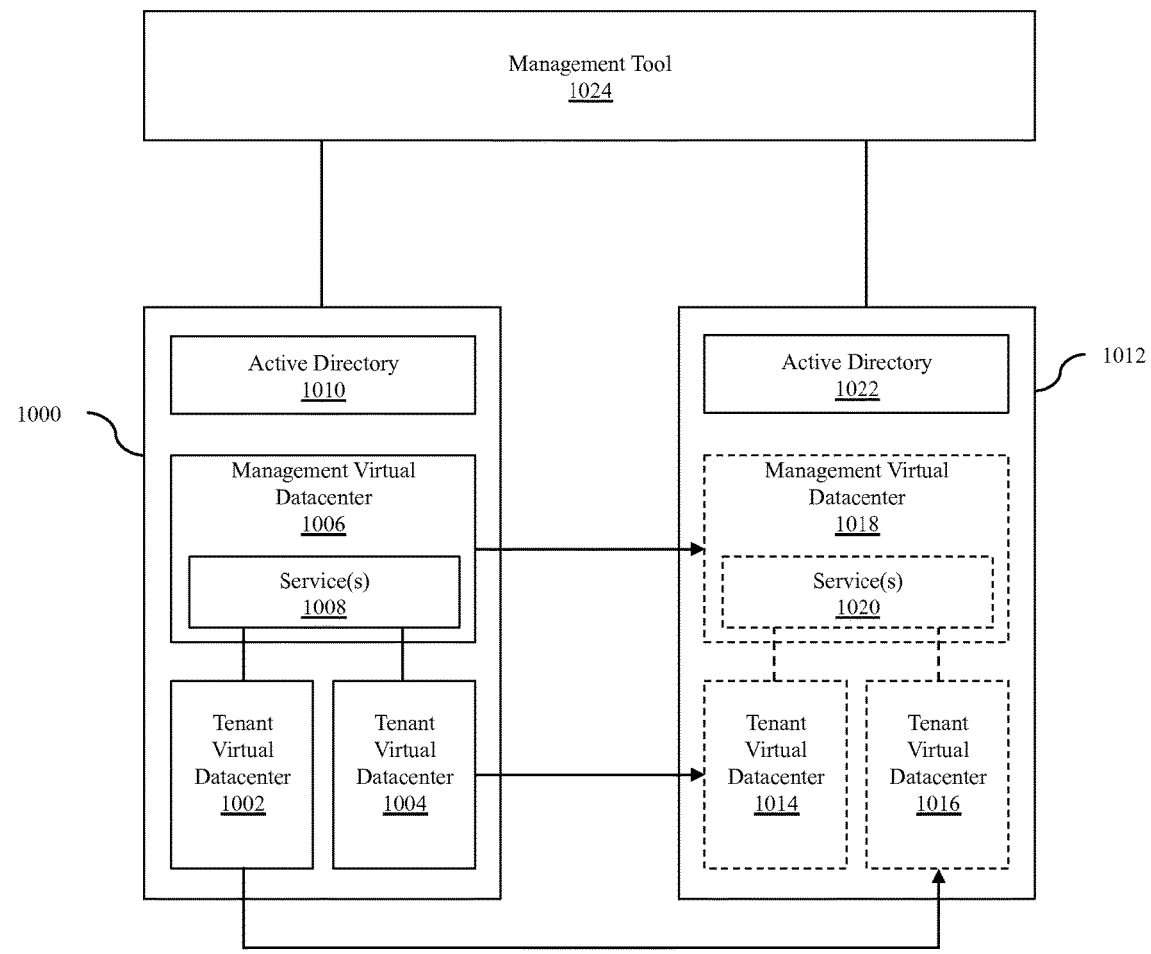
FIG. 10 is an architectural overview of a system providing virtual datacenter redundancy for disaster recovery consistent with an embodiment of the present disclosure.

FIG. 10 is an architectural overview for virtual datacenter redundancy and may be used during a disaster recovery scenario. A hosting location, such as hosting location 1000, may host one or more virtual datacenters, such as management virtual datacenter 1006 and/or tenant virtual data centers 1002 and 1004. The tenant virtual datacenters 1002 and 1004 may be in communication with the management virtual datacenter 1006, and may interact with services 1008 operating on management virtual datacenter 1006. In an embodiment, hosting location 1000 may also include active directory services 1010 which may control, among other things, access to management virtual datacenter 1006, tenant virtual datacenters 1002 and 1004, and/or workloads operating in the virtual datacenters.

An embodiment also includes secondary hosting location 1012, which may be geographically removed from hosting location 1000. Hosting location 1012 may comprise tenant virtual datacenters 1014 and 1016, which may be replicas of tenant virtual datacenters 1002 and 1004. Specifically, tenant virtual datacenter 1014 may be a replica of tenant virtual datacenter 1004, and tenant virtual datacenter 1016 may be a replica of tenant virtual datacenter 1002. In an embodiment, the replicated tenant virtual datacenters 1014 and 1016 are inactive, as shown by the dashed lines, while the primary tenant virtual datacenters 1002 and 1004 are active. Similarly, secondary hosting location 1012 may include management virtual datacenter 1018 comprising services 1020, where the management virtual datacenter 1018 is an inactive replica of management virtual datacenter 1006. Secondary hosting location 1012 may also include active directory services 1022, which are substantially similar to active directory services 1010.

In an embodiment, virtual datacenters 1002, 1004, and 1006 are replicated to hosting location 1012 in real time as changes are made to them at hosting location 1000. In other words, as a change is made to a virtual datacenter operating at hosting location 1000, that change is communicated, possibly over a network, to hosting location 1012. The arrows connecting the virtual datacenters illustrate this communication. The corresponding virtual datacenter on hosting 1012 is updated, thereby ensuring a substantially complete instance of the virtual datacenter exists on at least two locations. Additionally or alternatively, the virtual datacenter may be replicated to more than two hosting locations.

Additionally or alternatively, virtual datacenters 1002, 1004, and 1006 may be replicated to hosting location 1012 pursuant to a replication interval. This replication interval may be negotiated with a tenant, and/or may be a period of time specifying how often replication should occur. For example, the replication interval may be a period of minutes, hours, days, months, quarters, or years specifying how often replication should occur. A replication interval of 12 hours, for example, would mean the virtual datacenter would be replicated twice per day.

The replicated virtual datacenters 1014, 1016, and 1018 may allow rapid recovery in the event of a disaster. For example, if hosting location 1000 is destroyed or otherwise inaccessible, users may no longer be able to access virtual datacenters 1002, 1004, and/or 1006. The replicated virtual datacenters 1014, 1016, and 1018 may be quickly brought online, however, and all user traffic may be directed to hosting location 1012.

In an embodiment, users may always attempt to access the virtual datacenters via management tool 1024, which may be a user portal. The portal may direct user traffic to the appropriate hosting location, thereby providing the impression of continuous virtual datacenter availability even in the event of a disaster. In some embodiments, the portal may operate on gateway 101 and/or may be substantially similar to management tool 500. Additionally or alternatively, the portal may operate at hosting location 1000 and/or 1012. In such an embodiment, the portal at the second hosting location may have the same IP address as the portal at the first hosting location. As a result, user redirection may not be required.

In some embodiments, the replicated virtual datacenters 1014, 1016, and 1018 may be brought online within a designated recovery window. The designated recovery window may be negotiated with a tenant, and may specify the maximum amount of time allowed to recover a virtual datacenter. For example, a tenant may negotiate a premium designated recovery window that requires the virtual datacenter to be recovered in minutes. Additionally or alternatively, a basic recovery window may require the virtual datacenter to be recovered within twenty-four hours. A recovery window may be any period of time, including minutes, hours, days, quarter, or years.

With this understanding of the system architecture and the redundancy/recovery process, individual elements of FIG. 10 will be discussed in detail. In an embodiment, management virtual datacenters 1006 and 1018, and tenant virtual datacenters 1002, 1004, 1014, and 1016 may be substantially similar to virtual datacenters 100. A given tenant virtual datacenter may comprise software operating on virtual infrastructure with which a tenant and/or their users may interact. For example, tenant virtual datacenter 1002 may be provisioned to an online retailer. The tenant virtual datacenter 1004 may therefore include workloads for a web server, application server, and database, which together make an online store. Similarly, tenant virtual data 1002 may be provisioned to a different tenant who uses it for internal document management purposes.

Tenant virtual datacenters may be in communication with a management virtual datacenter, such as management virtual datacenters 1006 and 1018. Tenant virtual datacenter may interact with services operating on the management virtual datacenter, such as service 1008 and 1020. Services 1008 and 1020 may comprise a set of administrative and/or housekeeping services used by tenant virtual datacenters on a given hosting location. For example, services 1008 may comprise licensing services, email relay services, virtual datacenter/workload monitoring services, chargeback services, time services, domain name services ("DNS"), and/or active directory services. Additionally or alternatively, services 1008 may be substantially similar to services 501 discussed above.

Placing common services in management virtual datacenters 1006 and 1022 may improve system manageability. Rather than managing basic services at multiple locations, such as in multiple tenant workloads, these common services may operate in a single shared location. As a result, however, it may be necessary to replicate the management virtual datacenter and its services in a manner similar to the tenant virtual datacenters. Individual tenant virtual datacenters may contain references to the management virtual datacenter, and if they are activated in an environment lacking that management virtual datacenter they may be inoperable.

In an embodiment, a given hosting location only hosts one management virtual datacenter. Additionally or alternatively, a hosting location may host multiple management virtual datacenters. For example, hosting location 1012 may comprise inactive virtual datacenters 1014, 1016, and 1018 replicated from hosting location 1000. Hosting datacenter 1012 may also comprise, however, its own active virtual datacenters similar to virtual datacenters 1002, 1004, and 1006. In the event hosting location 1000 is inaccessible and virtual datacenters 1014, 1016, and 1018 are activated, hosting location 1012 may comprise two active management virtual datacenters. In such an embodiment, each active management virtual datacenter may comprise a unique identifier which allows the tenant virtual datacenters to access the appropriate management virtual datacenter.

Access to virtual datacenters may be controlled using active directory services 1010 and 1022. The term "active directory," as used throughout the specification, may include any access control system. For example, active directory service 1010 and 1022 may include a directory service using lightweight directory access protocol ("LDAP"). Additionally or alternatively, active directory service 1010 and 1022 may query a database of permissions to determine a given user's credentials. In an embodiment, active directory service 1010 may be Active Directory provided by Microsoft Corporation.

Active directory services 1010 may not be separate services running on the hosting location, as shown in FIG. 10, but may instead be service 1008 operating inside management virtual datacenter 1006. As discussed above, active directory service 1010 allows multiple tenants to have tenant virtual datacenters operating on the same hardware at a hosting location. Since access to the tenant virtual datacenters are access restricted, a given tenant does not need to worry that an unauthorized third party will access the tenant's virtual datacenter.

In some embodiments, active directory services may be distributed among all the hosting locations in a given environment, as shown by active directory 1010 and 1022 operating on hosting locations 1000 and 1012. Whenever a change is made to active directory, that change may be communicated to all of the hosting locations. In the event of a disaster and virtual datacenter relocation, the newly activated virtual datacenters may refer to the active directory on their local hosting center. This alleviates the need to immediately recover and migrate data in the active directory at the compromised datacenter.

In an embodiment, active directory services 1010 and 1022 may always be running on all of the hosting locations. This may be unlike virtual datacenters, which may only be active on a single hosting location at a given time. As a result, every active directory service at every hosting location may contain the necessary permissions to operate any virtual datacenter. This may be beneficial in the event multiple hosting locations are compromised at the same time. If a virtual datacenter has no available replicas on a viable hosting location, that virtual datacenter may be recovered from backup and start operating on any other hosting location with the active directory service. Additionally or alternatively, operating the active directory services throughout the entire system may allow a tenant to deploy new virtual datacenters on any hosting location, regardless of whether they have made such a deployment in the past.

In an embodiment, hosting locations 1000 and 1012 may be substantially similar to hosting locations 202. Hosting locations 1000 and 1012 may be physical hosting locations comprising a processing unit, non-transitory computer readable storage medium, and computer memory. Additionally or alternatively, hosting locations 1000 and 1012 may be virtual hosting locations such as a virtual server with virtual resources. It should be appreciated that even if the hosting locations are virtual locations, there must be some physical device underlying the virtual infrastructure.

In some embodiments, the hosting locations 1000 and 1012 are physically separated. For example, hosting location 1000 may reside in one country while hosting location 1012 resides in another. In an embodiment, a tenant who has been provisioned a tenant virtual datacenter, such as tenant virtual datacenters 1002 or 1004, may specify both primary and secondary hosting locations. A European tenant, for example, may specify two hosting locations within the European Union. Additionally or alternatively, hosting locations may be specified based on policies. Such policies may include "always assign European Tenants hosting locations in the European Union," "always assign tenants the two nearest hosting locations," and/or "always separate hosting locations by 'x' minimum and/or maximum distance."

Figure 11:
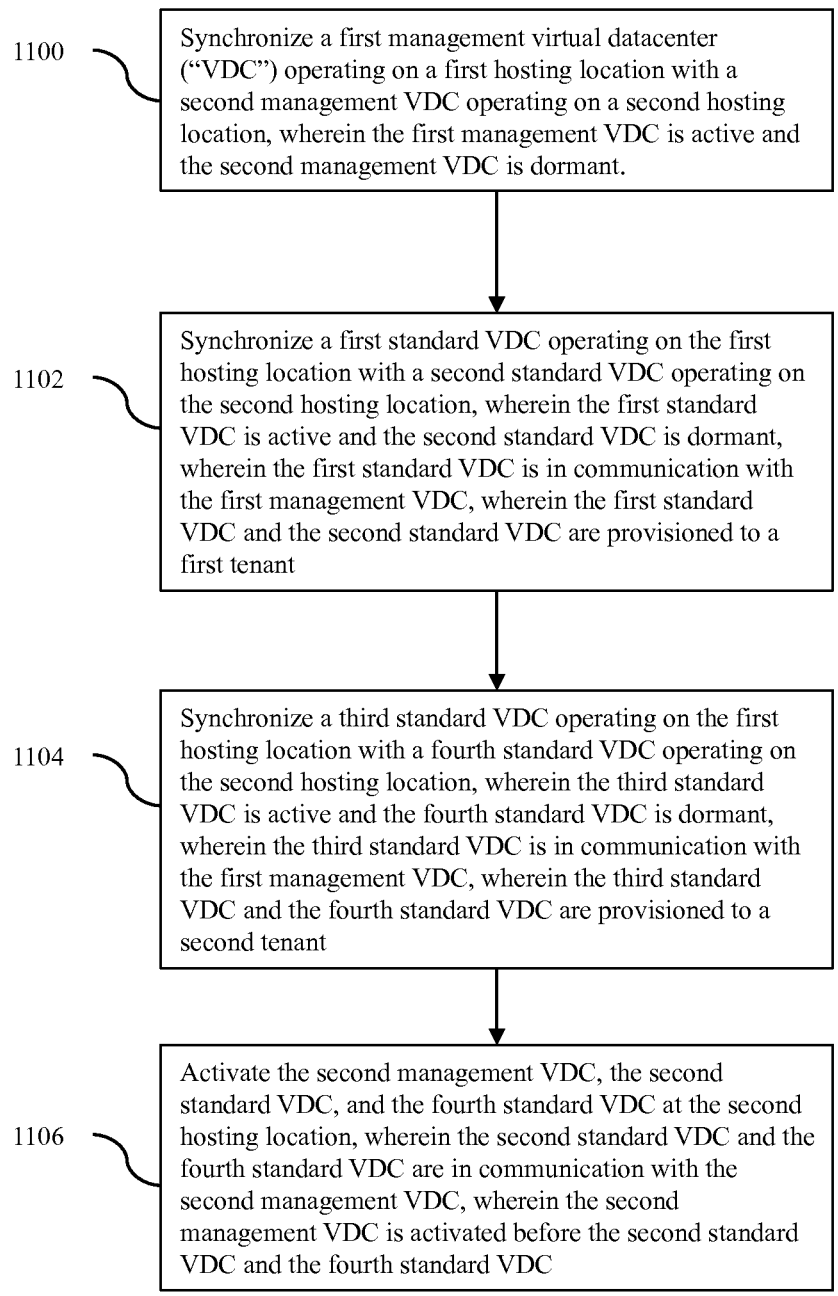
FIG. 11 is a flow chart illustrating a virtual datacenter synchronization and recovery process consistent with an embodiment of the present disclosure.

Turning now to FIG. 11, a flowchart depicting a synchronization and activation process consistent with an embodiment of the present disclosure is discussed.

At 1100, a first management virtual datacenter operating on a first hosting location is synchronized with a second management virtual datacenter operating on a second hosting location. In an embodiment, the first management virtual datacenter is active and the second management virtual datacenter is passive. The first management virtual datacenter may be, for example, management virtual datacenter 1006, and the first hosting location may be hosting location 1000. Similarly, the second management virtual datacenter may be management datacenter 1018, and the second hosting location may be hosting location 1012.

At 1102, a first standard virtual datacenter operating on the first hosting location may be synchronized with a second standard virtual datacenter operating on the second hosting location. In an embodiment, the first standard virtual datacenter may be active while the second standard virtual datacenter is dormant. Additionally or alternatively, the first standard virtual datacenter may be in communication with the first management virtual datacenter. In some embodiments the first standard virtual datacenter and the second standard virtual datacenter are provisioned to the same tenant (i.e. customer). The first standard virtual datacenter may be, in some embodiments, tenant virtual datacenter 1002. Similarly, the second standard virtual datacenter may be tenant virtual datacenter 1016.

At 1104, a third standard virtual datacenter operating on the first hosting location is synchronized with a fourth standard virtual datacenter operating on the second hosting location. The third standard virtual datacenter may be active, and the fourth standard virtual datacenter may be dormant. In some embodiments, the third standard virtual datacenter may be in communication with the first management virtual datacenter. Additionally or alternatively, the third and fourth standard virtual datacenter may be provisioned to a second tenant, where the second tenant is different than the first tenant. In an embodiment the third standard virtual datacenter may be substantially similar to tenant virtual datacenter 1004, and the fourth standard virtual datacenter may be substantially similar to tenant virtual datacenter 1014.

The synchronization process discussed in reference to blocks 1100, 1102, and 1104 may be accomplished in a variety of ways. For example, backup, de-duplication, and/or replication products may be used. Such products could be, for example, EMC® Avamar® or Networker® in conjunction with EMC® DataDomain. Additionally or alternatively, Veeam backup and recovery tools may be used. Any product capable of replicating virtual machines and/or virtual datacenters is consistent with the present disclosure.

Finally, at 1106, the second management virtual datacenter, the second standard virtual datacenter, and the fourth standard virtual datacenter may be activated. This activation could be, for example, in response to a disaster at the first hosting location. In some embodiments, the second management virtual datacenter may be activated before the standard virtual datacenters. This may be important if the second management virtual datacenter includes services, such as services 1020, on which the standard virtual datacenters rely. The second and fourth standard virtual datacenters may thereafter be activated and placed in communication with the second management virtual datacenter.

Figure 12:
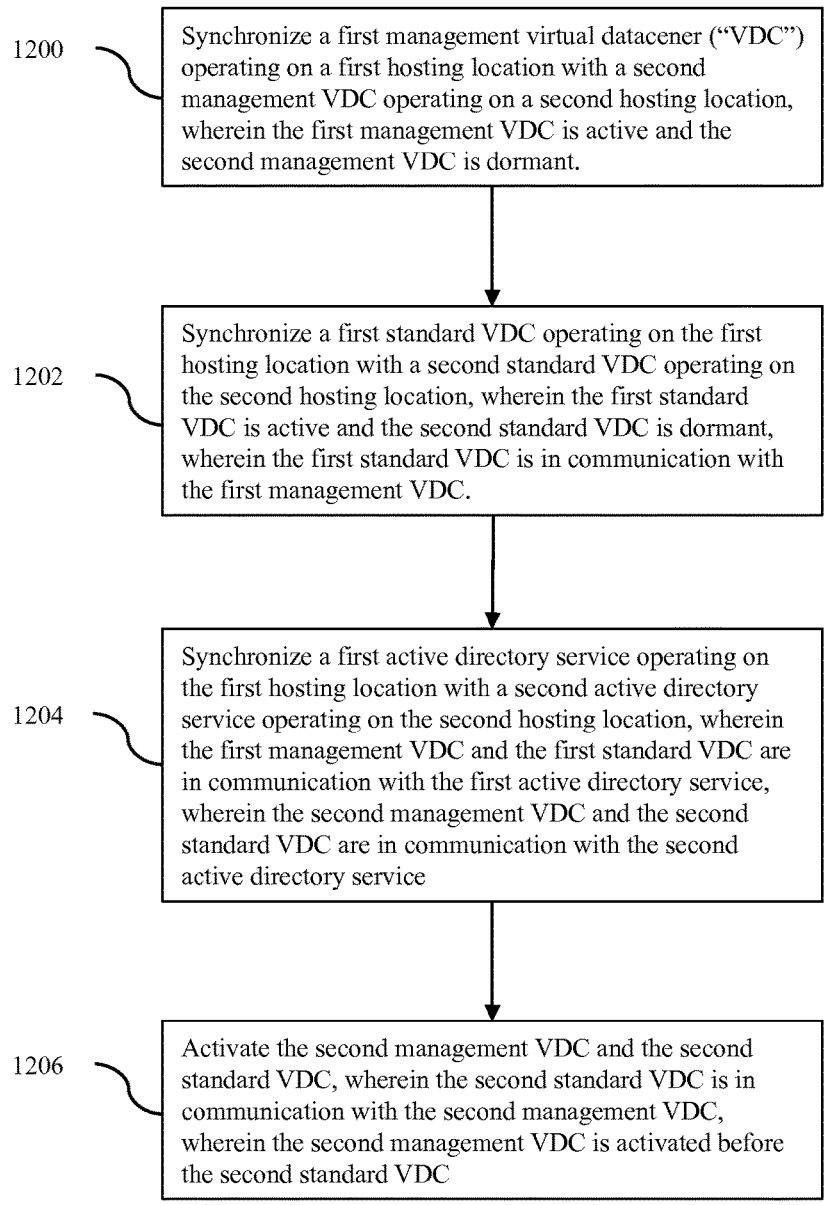
FIG. 12 is a flowchart depicting an active directory synchronization process for virtual datacenter disaster recovery.

FIG. 12 depicts a flowchart illustrating active directory synchronization consistent with an embodiment of the present disclosure.

At block 1200, a management virtual datacenter may be synchronized between two locations. This synchronization may be substantially similar to block 1100 discussed above. Similarly, at block 1202 a standard virtual datacenter is synchronized between two locations. This synchronization may be substantially similar to block 1102 as discussed above.

At 1204, a first active directory service operating on the first host may be synchronized with a second active directory service operating on a second host. The first active directory service could be, for example, active directory 1010. Similarly, second active directory service may be active directory 1022. Additionally or alternatively, the first active directory service may be service 1008 and the second active directory service may be services 1020. In some embodiments, both the first and second active directory services may be running at the same time.

In some embodiments, the first management virtual datacenter and the first standard virtual datacenter may be in communication with the first active directory service. Additionally or alternatively, when the second management virtual datacenter and the second standard virtual datacenter are activated, they may be in communication with the second active directory service.

Finally, at 1206, the second management virtual datacenter and the second standard virtual datacenter are activated. This activation process may be substantially similar to that discussed in reference to block 1106.

Figure 13:
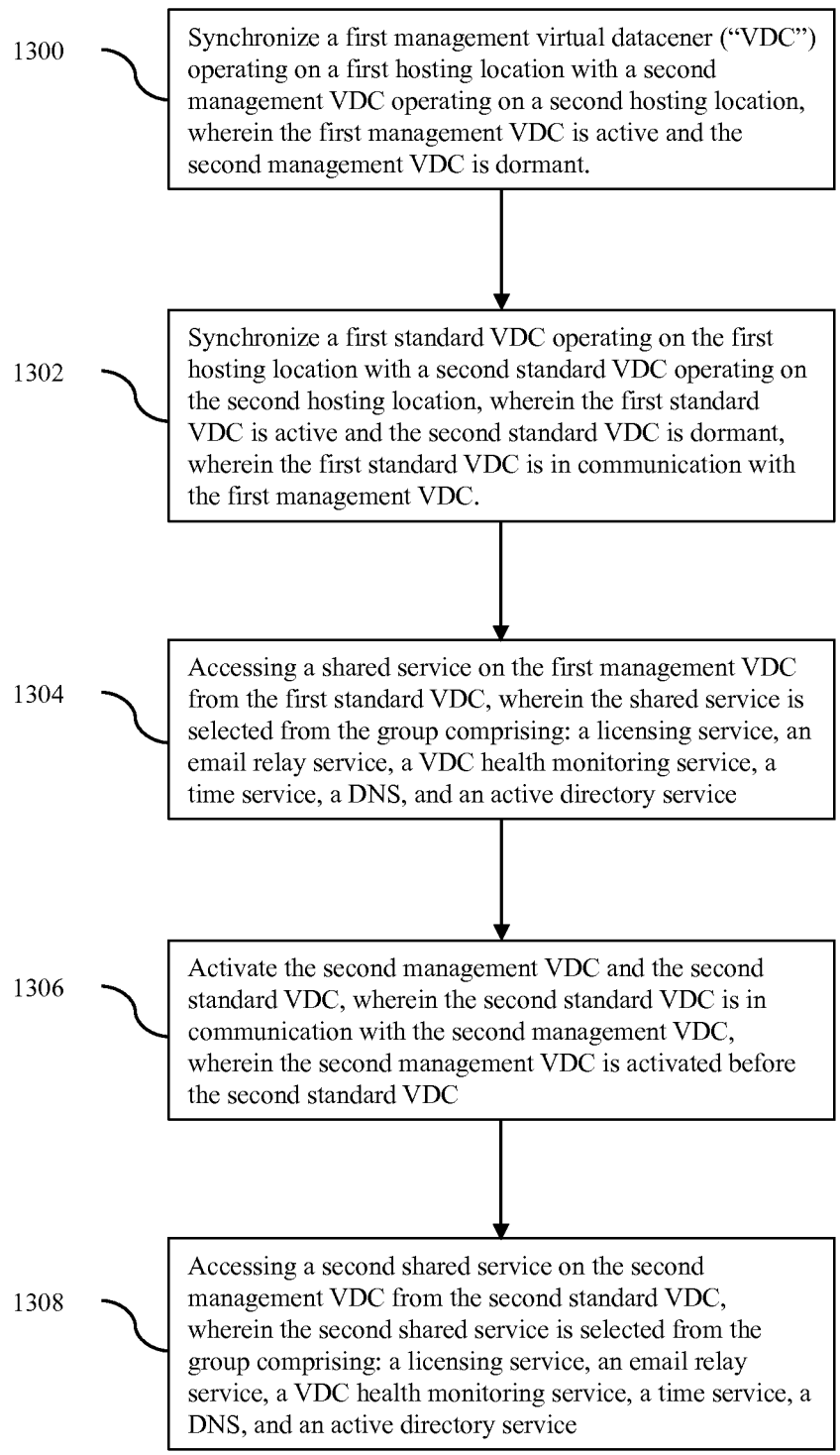
FIG. 13 is a flow chart depicting access to shared services operating on a management virtual datacenter consistent with an embodiment of the present disclosure.

Turning now to FIG. 13, a flow chart depicting access to shared services operating on a management virtual datacenter is discussed.

At 1300, a management virtual datacenter operating at a first hosting location is synchronized with a second management virtual datacenter operating at a second hosting location. In an embodiment, this block is substantially similar to blocks 1100 and 1200 as discussed above.

At 1302, a first standard virtual datacenter operating on a first hosting location is synchronized with a second virtual datacenter operating on a second hosting location. In an embodiment, the first standard virtual datacenter may be active while the second standard virtual datacenter is dormant. This synchronization process may be substantially similar to blocks 1102 and 1202 discussed above.

At 1304, a shared service operating on the first management virtual datacenter may be accessed from the first standard virtual datacenter. This could be, for example, service(s) 1008 operating in management virtual datacenter 1006 and accessed by tenant virtual datacenter 1002 (as shown by the line connecting tenant virtual datacenter 1002 to service(s) 1006). In some embodiments, the shared service may comprise a licensing service, an email relay service, a virtual datacenter and/or workload health monitoring service, a time service, a Domain Name Service ("DNS"), and/or an active directory service.

At block 1306, the second standard virtual datacenter and second management datacenter may be activated. In an embodiment, the second management virtual datacenter is activated before the second standard virtual datacenter. This process may be substantially similar to blocks 1106 and 1206 discussed above.

Finally, at block 1308, a second shared service operating on the second management virtual datacenter may be accessed from the second tenant virtual datacenter. This service may be, for example, service(s) 1020 operating on management virtual datacenter 1018 and accessed by tenant virtual datacenter 1016. These services may include those described in reference to block 1304.

The terms "active," "dormant," and "inactive," as used herein and applied to virtual datacenters may include several meanings. An active virtual datacenter, such as tenant virtual datacenter 1002, may be powered-up, online, and/or otherwise accessible to a user. An inactive or dormant virtual datacenter, such as tenant virtual datacenter 1014, may be powered-down, offline, and/or otherwise inaccessible to a user. Additionally or alternatively, an inactive or dormant datacenter may be powered-up but passive. The inactive or dormant virtual datacenter may not receive any user traffic because a user portal is directing that traffic to another location, or because an active directory service is configured to prohibit such access. These definitions of active and inactive/dormant described herein are non-limiting and provided solely for illustrative purposes.

Figure 14:
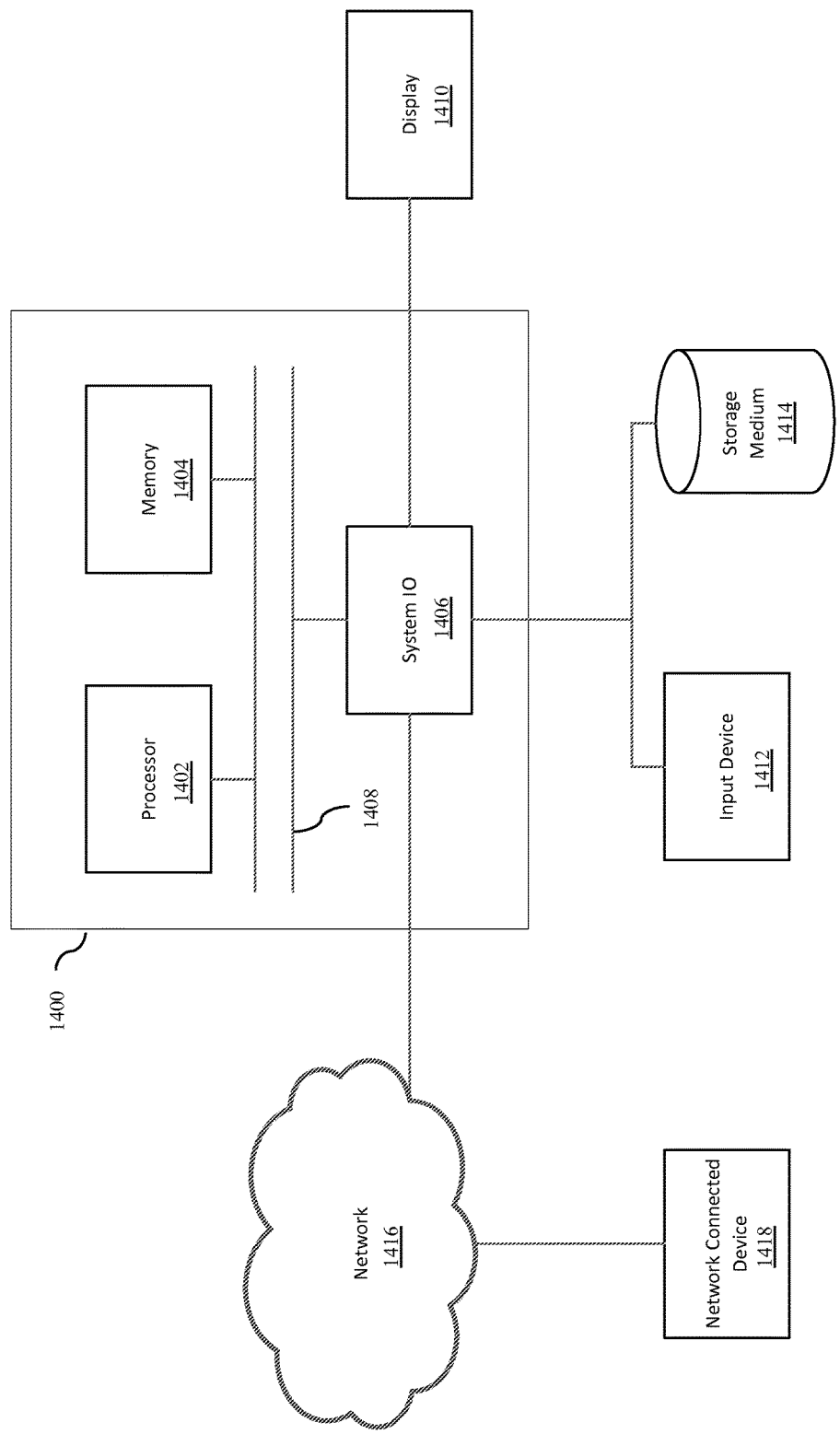
FIG. 14 is a diagram of a general purpose computer system consistent with an embodiment of the present disclosure.

FIG. 14 depicts a computer system which consistent with an embodiment of the present disclosure. General purpose computer 1400 may include processor 1402, memory 1404, and system IO controller 1406, all of which may be in communication over system bus 1408. In an embodiment, processor 1402 may be a central processing unit ("CPU") or accelerated processing unit ("APU"). Some embodiments may comprise multiple processors, or a processor with multiple cores. Processor 1402 and memory 1404 may together execute a computer process, such as the processes described herein, using input received from IO controller 1406.

System IO controller 1406 may be in communication with display 1410, input device 1412, non-transitory computer readable storage medium 1414, and/or network 1416. Display 1410 may be any computer display, such as a monitor, a smart phone screen, or wearable electronics and/or it may be an input device such as a touch screen. Input device 1412 may be a keyboard, mouse, track-pad, camera, microphone, or the like, and storage medium 1414 may comprise a hard drive, flash drive, solid state drive, magnetic tape, magnetic disk, optical disk, or any other computer readable and/or writable medium. Storage device 1414 may also reside inside general purpose computer 1400, rather than outside as shown in FIG. 14.

Network 1416 may be any computer network, such as a local area network ("LAN"), wide area network ("WAN") such as the internet, a corporate intranet, a metropolitan area network ("MAN"), a storage area network ("SAN"), a cellular network, a personal area network (PAN), or any combination thereof. Further, network 1416 may be either wired or wireless or any combination thereof, and may provide input to or receive output from IO controller 1406. In an embodiment, network 1416 may be in communication with one or more network connected devices 1418, such as another general purpose computer, smart phone, PDA, storage device, tablet computer, or any other device capable of connecting to a network.

In an embodiment, hosting locations 202 and/or 1000, gateway server 101, and/or resource pool 102 may comprise general purpose computer 1400 and/or network attached device(s) 1418. In an embodiment, virtual datacenters 100, workloads 104 and/or 106, and/or management tool 500 and/or 1024, may execute on general purpose computer 1400 and/or network attached device(s) 1418. The processes and methods described herein may be executed by processor 1402, and may read input from and/or write output to devices in communication with I/O controller 1406 and/or system bus 1408.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are hereby incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for defining a virtual datacenter application, comprising:
   creating an application template, wherein the application template defines the virtual datacenter application, the virtual datacenter application including a plurality of workloads grouped to form the virtual datacenter application;
   defining a role associated with the virtual datacenter application, wherein the role comprises a service account role;
   defining a service account associated with the virtual datacenter application, wherein the service account is assigned the service account role;
   defining a script establishing a communication between at least two workloads in the plurality of workloads, wherein the script is associated with the virtual datacenter application, wherein the service account role includes permissions to execute the script from the service account, wherein the association between the script and the service account guarantees that the script is executed on a correct workload with proper permissions, wherein the script is defined to execute according to an execution order organized over multiple additional workloads, wherein a first script is defined to execute on a first workload before a second script is defined to execute on a second workload, wherein the first script is different from the second script, wherein the first workload is different from the second workload;
   applying the role, the service account, and the script to at least one of the plurality of workloads; and
   storing the application template on a non-transitory computer readable storage medium.

2. The method of claim 1, wherein the role is one of a user role and a workload role.

3. The method of claim 2, further comprising providing permission to the at least one of the plurality of workloads to access an operating system feature from the workload role.

4. The method of claim 1, wherein the service account comprises a workload account configured to execute computer instructions residing in the at least one of the plurality of workloads.

5. The method of claim 1, wherein the plurality of workloads comprise a plurality of software solutions.

6. A computer program product comprising a non-transitory computer usable medium having machine readable code embodied therein for defining a virtual datacenter application, comprising:
   creating an application template, wherein the application template defines the virtual datacenter application, the virtual datacenter application including a plurality of workloads grouped to form the virtual data center application;

defining a role associated with the virtual datacenter application, wherein the role comprises a service account role;

defining a service account associated with the virtual datacenter application, wherein the service account is assigned the service account role;

defining a script establishing a communication between at least two workloads in the plurality of workloads, wherein the script is associated with the virtual datacenter application, wherein the service account role includes permissions to execute the script from the service account, wherein the association between the script and the service account guarantees that the script is executed on a correct workload with proper permissions, wherein the script is defined to execute according to an execution order organized over multiple additional workloads, wherein a first script is defined to execute on a first workload before a second script is defined to execute on a second workload, wherein the first script is different from the second script, wherein the first workload is different from the second workload;

applying the role, the service account, and the script to at least one of the plurality of workloads; and storing the application template on a non-transitory computer readable storage medium.

7. The computer program product of claim 6, wherein the role is one of a user role and a workload role.

8. The computer program product of claim 6, wherein the service account comprises a workload account configured to execute computer instructions residing in the at least one of the plurality of workloads.

9. A system for defining a virtual datacenter application, the system comprising a processor and a non-transitory computer readable medium, the processor configured to:

create an application template, wherein the application template defines the virtual datacenter application, the virtual datacenter application including a plurality of workloads grouped to form the virtual data center application;

define a role associated with the virtual datacenter application, wherein the role comprises a service account role;

define a service account associated with the virtual datacenter application, wherein the service account is assigned the service account role;

define a script establishing a communication between at least two workloads in the plurality of workloads, wherein the script is associated with the virtual datacenter application, wherein the service account role includes permissions to execute the script from the service account, wherein the association between the script and the service account guarantees that the script is executed on a correct workload with proper permissions, wherein the script is defined to execute according to an execution order organized over multiple additional workloads, wherein a first script is defined to execute on a first workload before a second script is defined to execute on a second workload, wherein the first script is different from the second script, wherein the first workload is different from the second workload;

apply the role, the service account, and the script to at least one of the plurality of workloads; and store the application template on a non-transitory computer readable storage medium.

10. The system of claim 9, wherein the role is one of a user role and a workload role.

11. The system of claim 9, wherein the service account comprises a workload account configured to execute computer instructions residing in the at least one of the plurality of workloads.

12. The method of claim 1, further comprising rebooting at least one of the plurality of workloads.

13. The method of claim 1, further comprising restarting the script.

* * * * *